United States Patent
Chun et al.

(10) Patent No.: US 10,359,803 B2
(45) Date of Patent: Jul. 23, 2019

(54) SYSTEM MEMORY LATENCY COMPENSATION

(71) Applicant: QUALCOMM INCORPORATED, San Diego, CA (US)

(72) Inventors: Dexter Tamio Chun, San Diego, CA (US); Richard Alan Stewart, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 219 days.

(21) Appl. No.: 15/601,924

(22) Filed: May 22, 2017

(65) Prior Publication Data

US 2018/0335798 A1 Nov. 22, 2018

(51) Int. Cl.
| G06F 1/32 | (2019.01) |
| G06F 1/08 | (2006.01) |
| G06F 3/06 | (2006.01) |
| G06F 1/3234 | (2019.01) |
| G06F 1/324 | (2019.01) |
| G06F 13/16 | (2006.01) |

(52) U.S. Cl.
CPC ............. G06F 1/08 (2013.01); G06F 1/324 (2013.01); G06F 1/3275 (2013.01); G06F 3/0611 (2013.01); G06F 3/0629 (2013.01); G06F 3/0683 (2013.01); G06F 13/1689 (2013.01)

(58) Field of Classification Search
CPC ....................................... G06F 1/32; G06F 9/44
See application file for complete search history.

(56) References Cited

U.S. PATENT DOCUMENTS

| 8,174,297 | B2 | 5/2012 | Kwak |
| 8,514,001 | B1 | 8/2013 | Lee |
| 8,723,577 | B2 | 5/2014 | Felix |
| 9,094,184 | B2 | 7/2015 | Staszewski et al. |
| 9,367,248 | B2 | 6/2016 | Hampel et al. |
| 2005/0008110 | A1* | 1/2005 | Lake ...................... H04L 7/0012 375/371 |
| 2007/0058478 | A1* | 3/2007 | Murayama ........... G11C 7/1051 365/233.12 |
| 2011/0018617 | A1* | 1/2011 | Htoo ..................... H02M 3/073 327/536 |
| 2012/0242385 | A1 | 9/2012 | Tokuhiro |
| 2012/0290800 | A1 | 11/2012 | Krishnan et al. |
| 2016/0035409 | A1 | 2/2016 | Gopalan et al. |
| 2018/0004270 | A1* | 1/2018 | Journet ................. G06F 9/3869 |

OTHER PUBLICATIONS

International Search Report and Written Opinion—PCT/US2018/024382—ISA/EPO—dated Jul. 31, 2018.

* cited by examiner

*Primary Examiner* — Jaweed A Abbaszadeh
*Assistant Examiner* — Keshab R Pandey
(74) *Attorney, Agent, or Firm* — Smith, Tempel Blaha LLC

(57) ABSTRACT

Pipelined logic latency in a memory system operating at a reduced frequency may be compensated for. Pipelined logic may be controlled using at least first and second clock signals. All registers of the pipelined logic may be controlled using the first clock signal when the memory system is operating at a higher frequency. However, when the memory system is operating at a reduced frequency, one or more registers may be controlled using the first clock signal, and one or more other registers may be controlled using the second clock signal.

27 Claims, 15 Drawing Sheets

1500

| REGISTER INSTANCE | $f_{LOW}$ CLOCK 1502 | $f_{LOW}$ MODE 1503 | $f_{MID}$ CLOCK 1504 | $f_{MID}$ MODE 1505 | $f_{HIGH}$ CLOCK 1506 | $f_{HIGH}$ MODE 1507 |
|---|---|---|---|---|---|---|
| Block0_reg_1102a 1550 | PHASE_0 | 00b | PHASE_0 | 00b | PHASE_0 | 00b |
| Block0_reg_1102b 1551 | PHASE_1 | 01b | PHASE_2 | 10b | PHASE_0 | 00b |
| Block0_reg_1102c 1552 | PHASE_3 | 11b | PHASE_0 | 00b | PHASE_0 | 00b |
| Block0_reg_1102d 1553 | PHASE_0 | 00b | PHASE_2 | 10b | PHASE_0 | 00b |
| . . . | | | | | | |
| Block0_reg_$N_0$ | PHASE_2 | 10b | PHASE_2 | 10b | PHASE_0 | 00b |
| . . . | | | | | | |
| BlockM_reg0 | PHASE_0 | 00b | PHASE_0 | 00b | PHASE_0 | 00b |
| BlockM_reg1 | PHASE_1 | 01b | PHASE_2 | 10b | PHASE_0 | 00b |
| BlockM_reg2 | PHASE_2 | 10b | PHASE_2 | 10b | PHASE_0 | 00b |
| . . . | | | | | | |
| BlockM_reg$N_M$ | PHASE_3 | 11b | PHASE_2 | 10b | PHASE_0 | 00b |

FIG. 15

SYSTEM MEMORY LATENCY COMPENSATION

DESCRIPTION OF THE RELATED ART

Portable computing devices ("PCD"s) are becoming necessities for people on personal and professional levels. These devices may include cellular telephones, portable digital assistants, portable game consoles, palmtop computers, and other portable electronic elements.

A PCD has various electronic systems that consume power, such as one or more cores of a system-on-chip ("SoC"). Cores may include, for example, central processing units ("CPU"s), graphics processing units ("GPU"s), digital signal processors ("DSP"s), and memory systems. As the quality of the user experience is related to system performance, it is desirable to maintain high system clock frequencies, wide system data paths, etc., to maximize performance. However, parameters associated with high performance, such as high clock frequency and power supply voltage, may impact power conservation. As power conservation is highly desirable in a battery operated PCD, dynamic voltage and frequency scaling ("DVFS") techniques have been developed to balance system performance with power consumption. For example, power management logic may monitor operating conditions in the PCD, including workload demand on a processor, core, SoC, or other system. When the power management logic detects that the workload demand on such a system is low, the power management logic may issue a command to a clock signal controller to set the frequency of the clock signal that controls the operation of the system to a lower frequency, which allows the power management logic to decrease the power supply voltage provided to the system or portions thereof, thereby conserving power without adversely affecting performance and thus the user experience. When the power management logic detects that the workload demand on such a system is higher, the power management logic may issue a command to the clock signal controller to set the frequency of the clock signal to a higher frequency, which generally requires that the power management logic also increase the power supply voltage, thereby preserving performance (and the user experience) at a cost of increased power consumption.

Memory latency may also affect the user experience, for example, by forcing a processor or other client device to wait for a memory access to be completed. The interface between a client device and a memory system may include pipelined logic controlled by a system clock. Memory latency therefore increases proportionally when a memory interface that is designed for high-bandwidth, high-frequency operation is forced to operate at a lower frequency. Memory latency may be reduced by operating the memory interface and associated systems at a higher clock frequency, but such a solution does not maximize power conservation.

SUMMARY OF THE DISCLOSURE

Systems, methods, and computer program products are disclosed for compensating for pipelined logic latency in memory systems.

In one aspect, a system for compensating for pipelined logic latency may include a clock phase controller, a clock frequency controller, and a memory interface between a client device and a memory system. The memory interface may have pipelined logic, including at least a first register and a second register. The clock frequency controller may be configured to adjust the system clock signal provided to the memory interface to a first frequency in response to detection of a high client device workload demand, and adjust the system clock signal provided to the memory interface to a second frequency lower than the first frequency in response to detection of a low client device workload demand. The clock phase controller may be configured to control the first and second registers using the first periodic clock edge signal in response to adjustment of the system clock signal to the first frequency. The clock phase controller may further be configured to, in response to adjustment of the system clock signal to the second frequency, control the first register using one of the first and second periodic clock edge signals, and control the second register using the other of the first and second periodic clock edge signals. A first periodic time interval between successive assertions of the first clock edge signal is greater than a second periodic time interval between an assertion of the first periodic clock edge signal and a next assertion of the second periodic clock edge signal following the assertion of the first periodic clock edge signal.

In another aspect, a method for compensating for pipelined logic latency may include detecting client device workload demand associated with a client device, adjusting a frequency of a system clock signal provided to a memory interface, and controlling pipelined logic of the memory interface using at least first and second periodic clock edge signals. The pipelined logic includes at least a first register and a second register. The system clock signal provided to the memory interface may be adjusted to a first frequency in response to detection of a high client device workload demand. The first and second registers may be controlled using the first periodic clock edge signal in response to adjustment of the system clock signal to the first frequency. The system clock signal provided to the memory interface may be adjusted to a second frequency lower than the first frequency in response to detection of a low client device workload demand. In response to adjustment of the system clock signal to the second frequency, the first register may be controlled using one of the first and second periodic clock edge signals, and the second register may be controlled using the other of the first and second periodic clock edge signals. A first periodic time interval between successive assertions of the first clock edge signal is greater than a second periodic time interval between an assertion of the first periodic clock edge signal and a next assertion of the second periodic clock edge signal following the assertion of the first periodic clock edge signal.

In still another aspect, a computer program product for compensating for pipelined logic latency may include processor-executable logic embodied in at least one non-transitory storage medium. Execution of the logic by one or more processors of a system may configure the system to detect client device workload demand associated with a client device, adjust a frequency of a system clock signal provided to a memory interface, and control pipelined logic of the memory interface using at least first and second periodic clock edge signals. The pipelined logic includes at least a first register and a second register. The system clock signal provided to the memory interface may be adjusted to a first frequency in response to detection of a high client device workload demand. The first and second registers may be controlled using the first periodic clock edge signal in response to adjustment of the system clock signal to the first frequency. The system clock signal provided to the memory interface may be adjusted to a second frequency lower than the first frequency in response to detection of a low client device workload demand. In response to adjustment of the system clock signal to the second frequency, the first register may be controlled using one of the first and second periodic clock edge signals, and the second register may be controlled using the other of the first and second periodic clock edge signals. A first periodic time interval between successive assertions of the first clock edge signal is greater than a second periodic time interval between an assertion of the first periodic clock edge signal and a next assertion of the second periodic clock edge signal following the assertion of the first periodic clock edge signal.

BRIEF DESCRIPTION OF THE DRAWINGS

In the Figures, like reference numerals refer to like parts throughout the various views unless otherwise indicated. For reference numerals with letter character designations such as "102A" or "102B", the letter character designations may differentiate two like parts or elements present in the same Figure. Letter character designations for reference numerals may be omitted when it is intended that a reference numeral to encompass all parts having the same reference numeral in all Figures.

FIG. 15 illustrates an example of the clock mode table of FIG. 13, in accordance with exemplary embodiments.

DETAILED DESCRIPTION

The word "exemplary" is used herein to mean "serving as an example, instance, or illustration." Any aspect described herein as "exemplary" is not necessarily to be construed as preferred or advantageous over other aspects.

The terms "central processing unit" ("CPU"), "digital signal processor" ("DSP"), and "graphics processing unit" ("GPU") are non-limiting examples of processors that may reside in a PCD. These terms are used interchangeably herein except where otherwise indicated.

The term "portable computing device" ("PCD") is used herein to describe any device operating on a limited capacity power supply, such as a battery. Although battery operated PCDs have been in use for decades, technological advances in rechargeable batteries coupled with the advent of third generation ("3G") and fourth generation ("4G") wireless technology have enabled numerous PCDs with multiple capabilities. Therefore, a PCD may be a cellular or mobile telephone, a satellite telephone, a pager, a personal digital assistant ("PDA"), a smartphone, a navigation device, a smartbook or reader, a media player, a combination of the aforementioned devices, a laptop or hand-held computer with a wireless connection or link, among others.

The terms "component," "module," "system," and the like are used herein to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes, such as in accordance with a signal having one or more data packets (e.g., data from one component interacting with another component in a local system, distributed system, and/or across a network such as the Internet with other systems by way of the signal).

The terms "application" or "application program" may be used synonymously to refer to a software entity having executable content, such as object code, scripts, byte code, markup language files, patches, etc. In addition, an "application" may further include files that are not executable in nature, such as data files, configuration files, documents, etc.

Figure 1:
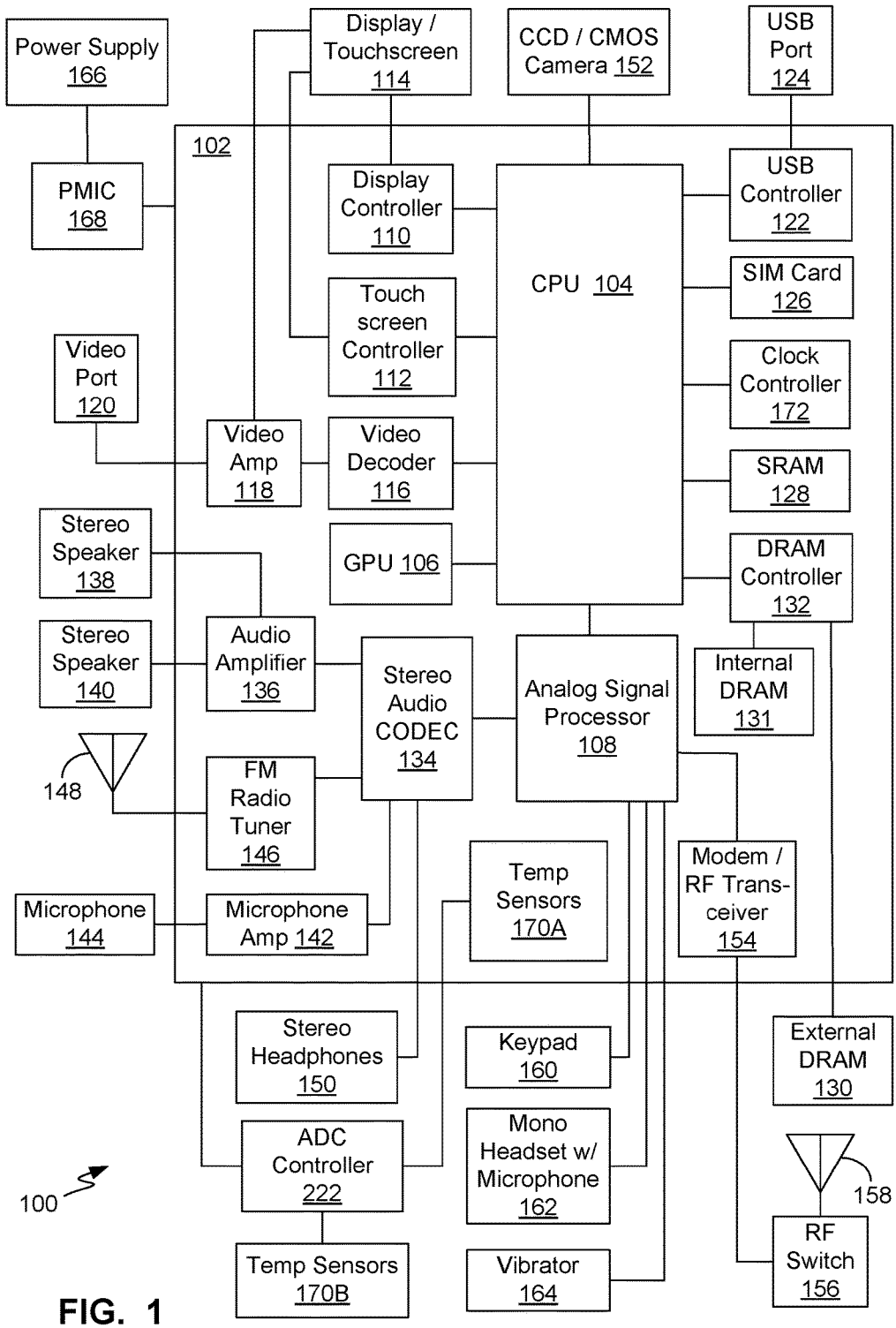
FIG. 1 is a block diagram of a portable computing device that may include a system for compensating for system memory latency, in accordance with exemplary embodiments.

As illustrated in FIG. 1, in illustrative or exemplary embodiments, systems, methods, and computer program products for system memory latency compensation may be embodied in a PCD 100. PCD 100 includes a system on chip ("SoC") 102, i.e., a system embodied in an integrated circuit chip. SoC 102 may include a central processing unit ("CPU") 104, a graphics processing unit ("GPU") 106, or other processors. PCD 102 may include an analog signal processor 108.

A display controller 110 and a touchscreen controller 112 may be coupled to CPU 104. A touchscreen display 114 external to SoC 102 may be coupled to display controller 110 and touchscreen controller 112. PCD 102 may further include a video decoder 116. Video decoder 116 is coupled to CPU 104. A video amplifier 118 may be coupled to video decoder 116 and touchscreen display 114. A video port 120 may be coupled to video amplifier 118. A universal serial bus ("USB") controller 122 may also be coupled to CPU 104, and a USB port 124 may be coupled to USB controller 122. A subscriber identity module ("SIM") card 126 may also be coupled to CPU 104.

One or more memories may be coupled to CPU 104. The one or more memories may include both volatile and non-volatile memories. Examples of volatile memories include static random access memory ("SRAM") 128 and dynamic RAMs ("DRAM"s) 130 and 131. Such memories may be external to SoC 102, such as DRAM 130, or internal to SoC 102, such as a DRAM 131. A DRAM controller 132 coupled to CPU 104 may control the writing of data to, and reading of data from, DRAMs 130 and 131. In other embodiments, such a DRAM controller may be included within a processor, such as CPU 104.

A stereo audio CODEC 134 may be coupled to analog signal processor 108. Further, an audio amplifier 136 may be coupled to stereo audio CODEC 134. First and second stereo speakers 138 and 140, respectively, may be coupled to audio amplifier 136. In addition, a microphone amplifier 142 may be also coupled to stereo audio CODEC 134, and a microphone 144 may be coupled to microphone amplifier 142. A frequency modulation ("FM") radio tuner 146 may be coupled to stereo audio CODEC 134. An FM antenna 148 may be coupled to the FM radio tuner 146. Further, stereo headphones 150 may be coupled to stereo audio CODEC 134. Other devices that may be coupled to CPU 104 include a digital camera 152.

A modem or radio frequency ("RF") transceiver 154 may be coupled to analog signal processor 108. An RF switch 156 may be coupled to RF transceiver 154 and an RF antenna 158. In addition, a keypad 160, a mono headset with a microphone 162, and a vibrator device 164 may be coupled to analog signal processor 108.

A power supply 166 may be coupled to SoC 102 via a power management integrated circuit ("PMIC") 168. Power supply 166 may include a rechargeable battery or a DC power supply that is derived from an AC-to-DC transformer connected to an AC power source.

The CPU 104 may also be coupled to one or more internal, on-chip thermal sensors 170A as well as one or more external, off-chip thermal sensors 170B. The thermal sensors 170A and 1709 may produce a voltage drop that is converted to digital signals with an analog-to-digital converter ("ADC") controller 222.

The touch screen display 114, the video port 120, the USB port 124, the camera 152, the first stereo speaker 138, the second stereo speaker 140, the microphone 144, the FM antenna 148, the stereo headphones 150, the RF switch 156, the RF antenna 158, the keypad 160, the mono headset 162, the vibrator 164, thermal sensors 170B, and the PMIC 168, the power supply 166, and the DRAM 130 are external to the SoC 102 in this exemplary or illustrative embodiment. It will be understood, however, that in other embodiments one or more of these devices may be included in such an SoC.

The SoC 102 may include a clock controller 172. Clock controller 172 may adjust the frequencies of one or more system clock signals used by various systems, such as processor and memory systems. Clock controller 172 may dynamically adjust such clock frequencies in response to operating conditions, such as a measured or predicted workload demand on a processor, core, SoC, or other system. For example, when clock controller 172 detects a high processor workload demand, clock controller 172 may set the frequency of the clock signal supplied to the processor to a high frequency. Likewise, when clock controller 172 detects a low processor workload demand, clock controller 172 may set the frequency of the clock signal supplied to the processor to a low frequency. As used in this description, the terms "high frequency" and "low frequency" are intended to have no significance other than to indicate relative value with respect to each other; the high frequency is higher than the low frequency. This dynamic frequency scaling may be used in conjunction with dynamic voltage scaling. The PMIC 168 may set the supply voltage of a clocked system to a high voltage level when the clock signal supplied to the system is set to a high frequency, and set the supply voltage to a low voltage level when the clock signal supplied to the system is set to a low frequency. As used in this description, the terms "high voltage" and "low voltage" are intended to have no significance other than to indicate relative value with respect to each other; the high voltage is higher than the low voltage. A reduction in supply voltage generally results in a proportional savings in power consumed by the system. The dynamic adjustment of supply voltage and clock frequency may be referred to as dynamic voltage and frequency scaling ("DVFS"). As understood by one of ordinary skill in the art, DVFS techniques enable trade-offs between power consumption and performance.

Figure 2:
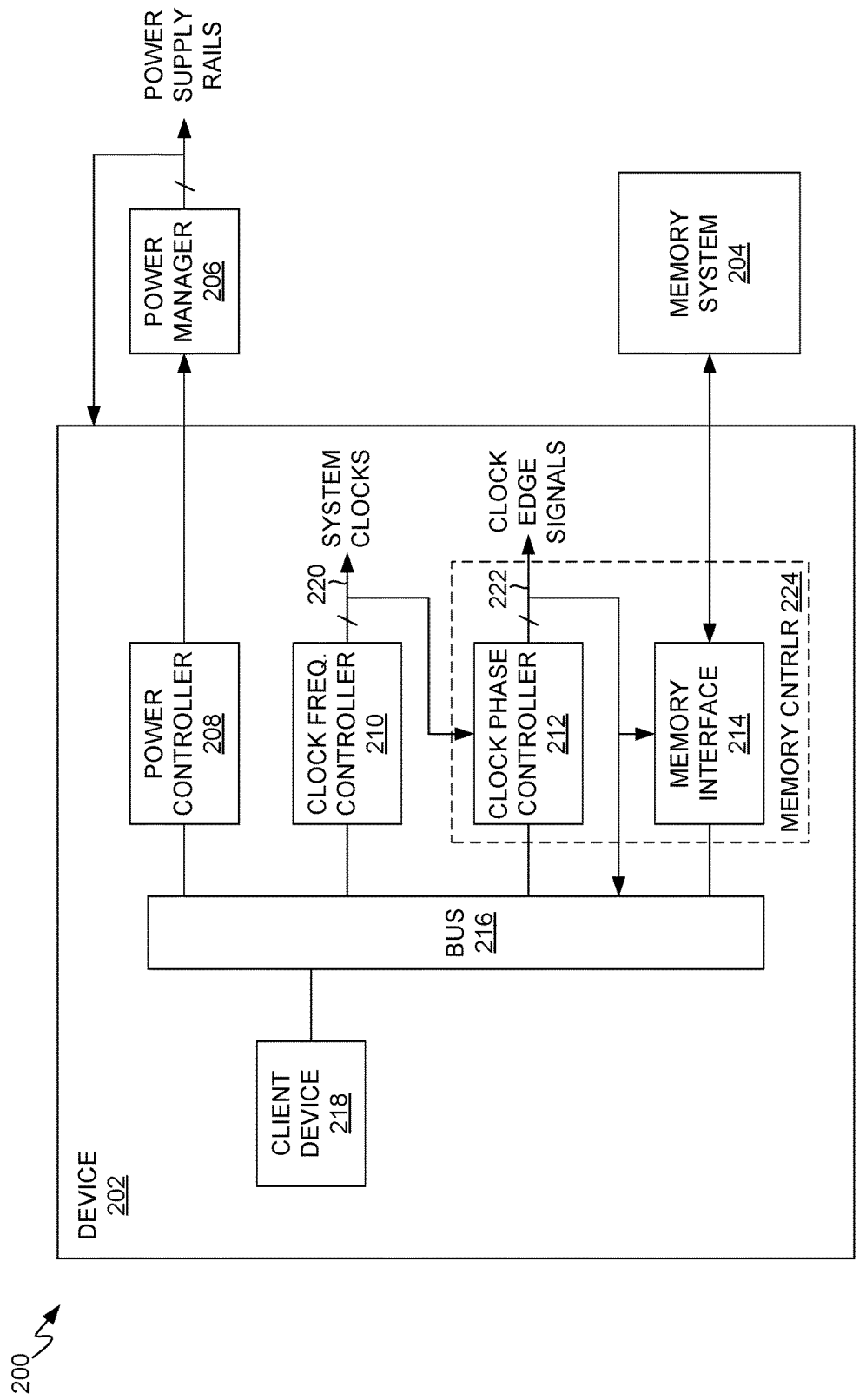
FIG. 2 is a block diagram of a system for compensating for system memory latency, in accordance with exemplary embodiments.

As illustrated in FIG. 2, an exemplary system 200 may include a device 202, a memory system 204, and a power manager 206. The SoC 102 described above with regard to FIG. 1 may be an example of device 202. The PMIC 168 described above with regard to FIG. 1 may be an example of power manager 206. The DRAM 130 described above with regard to FIG. 1 may be an example of memory system 204.

Device 202 may include a power controller 208, a clock frequency controller 210, a clock phase controller 212, and a memory controller or interface 214, all of which may communicate with each other via a bus 216. A client device 218 may also communicate with the foregoing components via bus 216. Examples of client device 218 include CPU 104 (or a core thereof), GPU 106, clients relating to camera 152 and display 114, etc., described above with regard to FIG. 1. Although only one exemplary client device 218 is shown in FIG. 2 for purposes of clarity, other such client devices may be similarly coupled to bus 216. Power controller 208 controls or otherwise communicates with power manager 206. Clock frequency controller 210 generates one or more system clock signals 220. Clock frequency controller 210 may monitor for and detect workload demand on client device 218, and adjust the frequencies of the one or more system clock signals 220 in response to the detected client workload demand. Power manager 206 may adjust one or more power supply voltages (i.e., voltage rails) provided to device 202 in accordance with the clock frequency, so as to promote stable clock signals. Thus, for example, in response to clock frequency controller 210 setting one such system clock signal 220 to a high frequency, power manager 206 may set a corresponding power supply rail to a high voltage. Likewise, in response to clock frequency controller 210 setting one such system clock signal 220 to a low frequency, power manager 206 may set a corresponding power supply rail to a low voltage.

Clock phase controller 212 receives at least one such system clock signal 220 generated by clock frequency controller 210. In response to, or based on, the frequency of such a system clock signal 220, clock phase controller 212 generates clock edge signals 222. Clock edge signals 222 are provided to various clocked systems, such as bus 216, memory interface 214, and memory system 204 (via memory interface 214). At least some of these clocked systems are characterized by pipelined logic or stages. Accordingly, data may take many clock cycles to propagate through such a system. For example, it may take many clock cycles for data to propagate between client device 218 and memory system 204 via bus 216 and memory interface 214. An example of pipelined logic 300 that may characterize each such clocked system is illustrated in generalized form in FIG. 3.

As described in further detail below, clock edge signals 222 may be characterized by or defined by their edges, which are used to trigger or control registers of the pipelined logic. In some examples described below, clock edge signals 222 may comprise a pair of complementary signals, one of which corresponds to the system clock on which it is based. In other examples described below, clock edge signals 222 may comprise any number of phase-delayed versions of the system clock on which they are based.

Figure 3:
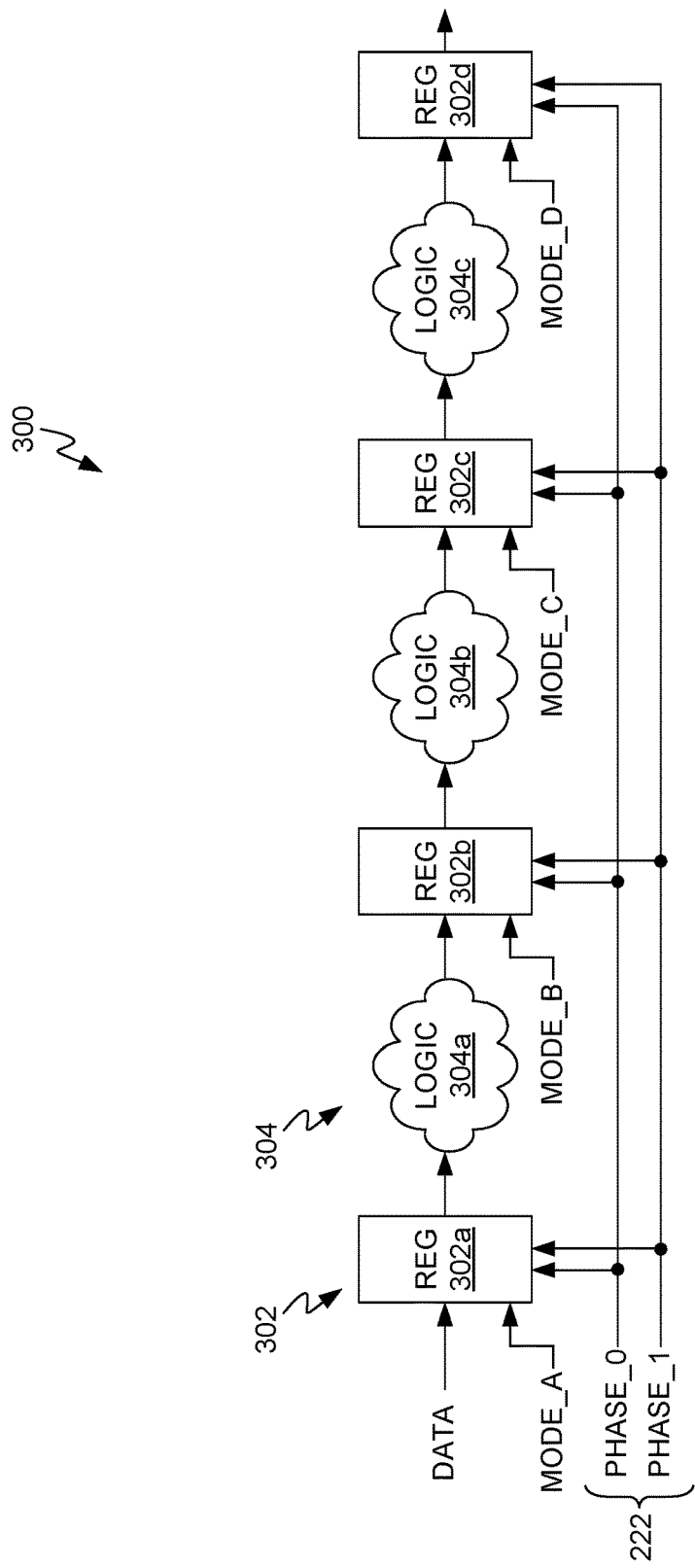
FIG. 3 is a block diagram of pipelined logic provided with complementary system clock signals, in accordance with exemplary embodiments.

As illustrated in FIG. 3, such pipelined logic 300 may include any number of registers 302, such as exemplary registers 302a, 302b, 302c, and 302d. Combinational logic 304 may be interposed between pairs of registers 302. For example, logic 304a may be interposed between registers 302a and 302b, logic 304b may be interposed between registers 302b and 302c, and logic 304c may be interposed between registers 302c and 302d. That is, the data input of register 302b is pipelined to the data output of register 302a via logic 304a, the data input of register 302c is pipelined to the data output of register 302b via logic 304b, and the data input of register 302d is pipelined to the data output of register 302c via logic 304c. In the context of pipelined architectures in which there are three or more registers, alternate registers may be referred to for convenience in this disclosure as "odd" and "even." For example, registers 302a and 302c may be referred to as even registers, and registers 302b and 302d may be referred to as odd registers. Alternatively, registers 302a and 302c may be referred to as odd registers, and registers 302b and 302d may be referred to as even registers. In other words, as used in this disclosure, the terms "odd" and "even" are intended to have no significance other than to identify alternating registers. Although in the embodiment shown in FIG. 3, registers 302a-302d comprise D-type flip-flops, in other embodiments the pipelined logic may employ other types of delay elements, such as transparent latches, J-K flip flops, S-R flip flops, toggle flip flops, delay lines, etc.

Circuit elements including registers 302, combinational logic 304, circuitry that generates clock edge signals 222, etc., may be powered by one or multiple power supply voltage rail(s) sourced from power manager 206 (FIG. 2). The voltage rails may increase or decrease in voltage depending on system characteristics such as clock frequency. For example, the voltage rail may be lowered when operating at a low clock frequency and raised when operating at a high clock frequency. There may be multiple operating points, e.g., a low clock frequency with low voltage, a middle clock frequency with middle voltage, and a high clock frequency with high voltage, etc. Alternatively other embodiments, the voltage rail(s) may instead be statically fixed while only adjusting the clock frequency.

Figure 4:
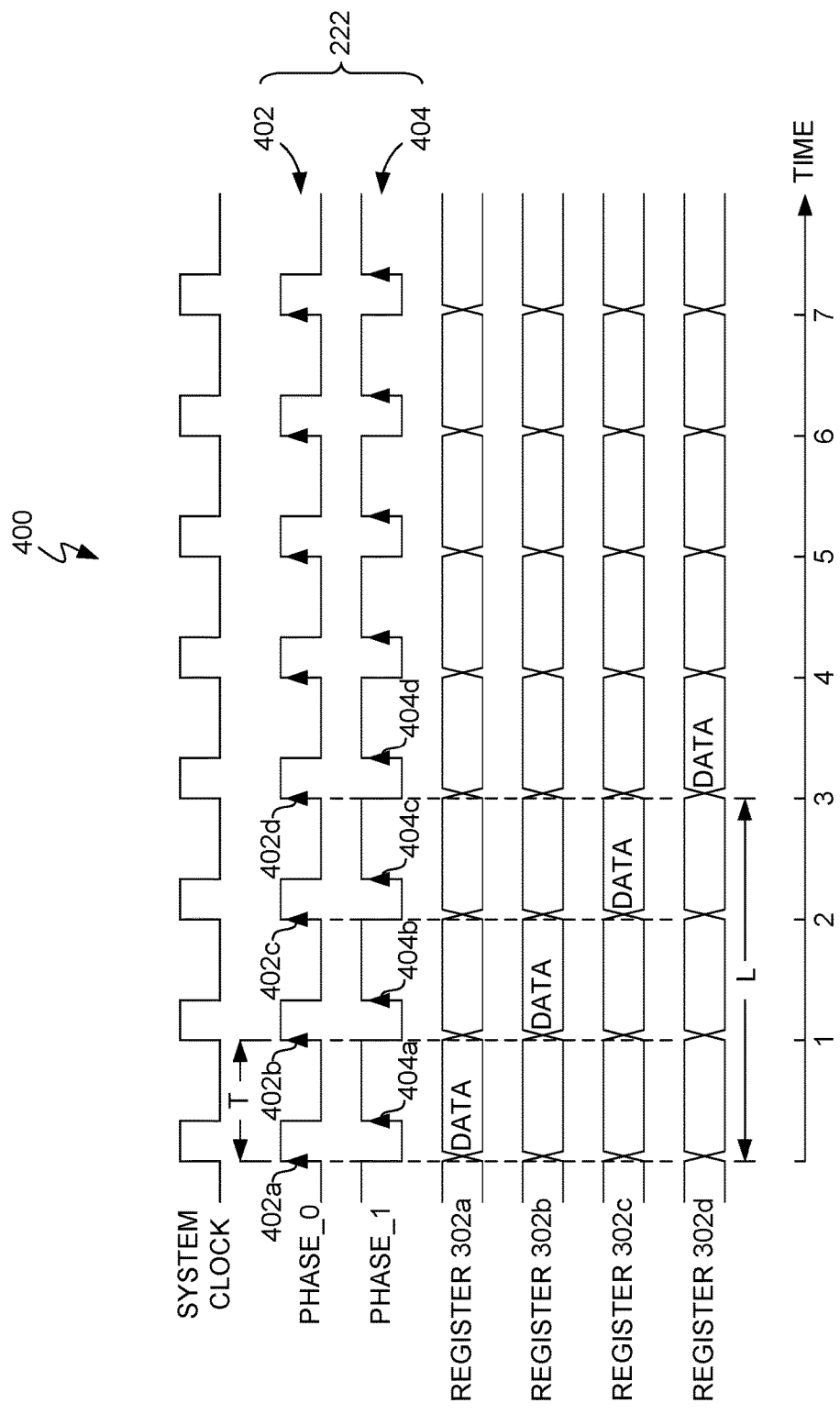
FIG. 4 is a timing diagram, illustrating operation of the pipelined logic of FIG. 3, in accordance with exemplary embodiments.

In the timing diagram of FIG. 4, exemplary timing 400 may describe an example of operation of one of the systems or components of device 202 (FIG. 2), such as memory interface 214, or a system that is a combination of two or more systems or components, such as client device 218, bus 216, memory interface 214, and memory system 204. In FIG. 4, a "PHASE_0" clock edge signal is an example of one of the clock edge signals 222 generated by clock phase controller 212 (FIG. 2) based on one of the system clock signals 220 ("SYSTEM CLOCK"). The PHASE_0 clock edge signal may correspond to one such system clock signal 220. That is, the PHASE_0 clock edge signal may have the same frequency, duty cycle, and other characteristics as the system clock signal on which it is based. Although in the example shown in FIG. 4 the PHASE_0 clock edge signal is phase locked to the system clock signal ("SYSTEM CLOCK"), resulting in the phase-matched PHASE_0 clock edge signal, in other examples (not shown) such a PHASE_0 clock edge signal may be a time delayed version of the system clock signal, resulting in a slight delay of the PHASE_0 clock edge signal from the system clock signal. Generation of the PHASE_0 or PHASE_1 clock edge signals may leverage known techniques, such as a simple inverter, phase-locked loop, delay-locked loop, etc. There may also be clock gating involved where the system clock signal may temporarily and intermittently become a static logic 1 or logic 0 during idle periods, and subsequently the PHASE_0 clock edge signal may likewise temporarily and intermittently become a static logic 1 or 0. Additionally, the frequency of system clock signal may remain exact and steady or it may be time varying, for example, as when incorporating a spread spectrum modulation for the purposes of suppressing radio frequency interference. The exemplary system clock signal ("SYSTEM CLOCK") shown in FIG. 4 has a period "T" and an asymmetric (i.e., non-50%) duty cycle. However, in other examples the system clock signals may have any characteristics. The PHASE_0 clock edge signal is a periodic signal that is asserted at intervals of the period "T". As used in this description, "assertion" of a clock edge signal 222, such as the PHASE_0 clock edge signal, refers to the occurrence of an identified or "true" digital signal level transition, i.e., an identified or true edge. The identified or true edge may be a rising edge in some examples, or a falling edge in other examples. In the example shown in FIG. 4, the identified or true edges of the PHASE_0 clock edge signal are the rising edges 402, such as edge 402a, edge 402b, edge 402c, and edge 402d, and the PHASE_0 clock edge signal is defined by the successive assertions of rising edges 402. As the term is used this description, a clock edge signal 222, such as the PHASE_0 clock edge signal in FIG. 4, is "asserted" during the occurrence of the identified edge and not "asserted" at all other times. Another clock edge signal, PHASE_1, which is the complement of the PHASE_0 clock edge signal in this example, is also shown in FIG. 4 for reference but not used in this example. It may be noted, however, that in the example shown in FIG. 4 the identified or true edges of the PHASE_1 clock edge signal are the rising edges 404, such as edge 404a, edge 404b, edge 404c, and edge 404d. It may also be noted that in the example shown in FIG. 4, the PHASE_0 clock edge signal is defined by, or corresponds to, successive assertions of true edges of the system clock signal ("SYSTEM CLOCK"), such as the rising edges of the system clock signal, and the PHASE_1 clock edge signal is defined by, or corresponds to, successive assertions of complement edges of the system clock signal, such as the falling edges of the system clock signal. In other words, in the example shown in FIG. 4 the PHASE_0 clock edge signal corresponds to the system clock signal ("SYSTEM CLOCK"), and the PHASE_1 clock edge signal corresponds to the complement of the system clock signal.

In the example shown in FIG. 4, the PHASE_0 clock edge signal corresponds to one of system clock signals 220 ("SYSTEM CLOCK") on which memory interface 214 (FIG. 2) or other such system operates. Accordingly, data in the form of one or more bits, words, etc., propagates through the pipelined logic of memory interface 214 or other such system in synchronism with the PHASE_0 clock edge signal. In the example shown in FIG. 4, the frequency of the PHASE_0 clock edge signal may be the "high" frequency to which clock frequency controller 210 set or adjusted the corresponding one of system clock signals 220 ("SYSTEM CLOCK") in response to detection of a high workload demand for client device 218.

In response to adjustment of the system clock signal to the high frequency, clock phase controller 212 controls all of registers 302 (FIG. 3) using only one of the periodic clock edge signals 222, such as the PHASE_0 clock edge signal. Accordingly, in the example shown in FIGS. 3-4, in response to a first assertion of the PHASE_0 clock edge signal defined by edge 402a, register 302a captures and stores exemplary data ("DATA"). This data propagates from the data output of register 302a to the data input of register 302b via logic 304a, which delays the signal propagation. In this example (FIGS. 3-4), pipelined logic 300 meets all timing thresholds, such as setup and hold times of registers 302a-302d. Accordingly, in response to a second assertion of the PHASE_0 clock edge signal defined by edge 402b, register 302b captures and stores the exemplary data. This data propagates from the data output of register 302b to the data input of register 302c via logic 304b, which delays the signal propagation. As logic 304b does not delay the data enough to violate timing thresholds in this example, register 302c captures and stores the exemplary data in response to a third assertion of the PHASE_0 clock edge signal defined by edge 402c. This data propagates from the data output of register 302c to the data input of register 302d via logic 304c, which delays the signal propagation. As logic 304c does not delay the data enough to violate timing thresholds in this example, register 302d captures and stores the exemplary data in response to a fourth assertion of the PHASE_0 clock edge signal defined by rising edge 402d. In this example, applying the high clock frequency (with high voltage supply rail) does not impede pipelined logic 300 from meeting timing thresholds.

In the example described above with regard to FIGS. 3-4, the total latency of the data through pipelined logic 300 is 3 periods of the system clock signal or PHASE_0 clock edge signal. In the arbitrary units of time with which the time axis in FIG. 4 is labeled, the total latency ("L") of pipelined logic 300 is 3 time units when the frequency of the PHASE_0 clock edge signal is set to the "high" frequency.

Figure 5:
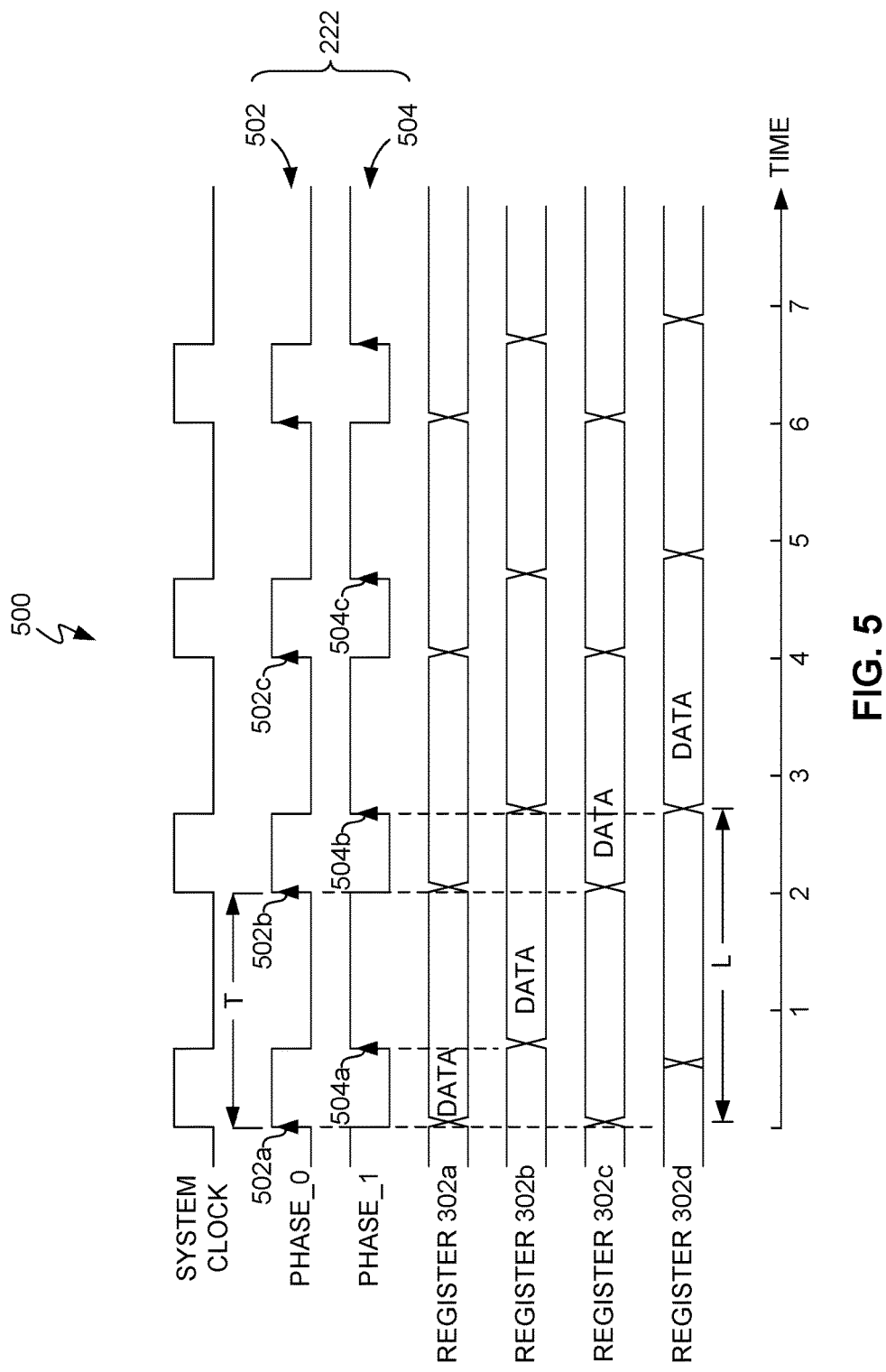
FIG. 5 is similar to FIG. 4, but illustrates compensating for system memory latency when the system clock is set to a lower frequency, in accordance with exemplary embodiments.

In the timing diagram of FIG. 5, exemplary timing 500 may describe an example of operation of one of the systems or components of device 202 (FIG. 2), such as memory interface 214, or a system that is a combination of two or more systems or components, such as client device 218, bus 216, memory interface 214, and memory system 204. The PHASE_0 and PHASE_1 clock edge signals shown in FIG. 5 are similar to those described above with regard to FIG. 4, except that in the example of operation shown in FIG. 5, the frequency of the PHASE_0 clock edge signal may be the "low" frequency to which clock frequency controller 210 set or adjusted the corresponding one of system clock signals 220 ("SYSTEM CLOCK") in response to detection of a low workload demand for client device 218. Thus, in the example shown in FIG. 5 the identified or true edges of the PHASE_0 clock edge signal are similarly the rising edges 502, such as edge 502a, edge 502b, and edge 502c, and the identified or true edges of the PHASE_1 clock edge signal are the rising edges 504, such as edge 504a, edge 504b, and edge 504c. In response to adjustment of the system clock signal to the low frequency, clock phase controller 212 controls registers 302a and 302c using one of the PHASE_0 and PHASE_1 clock edge signals, such as the PHASE_0 clock edge signal, and controls registers 302b and 302d using the other of the PHASE_0 and PHASE_1 clock edge signals, such as the PHASE_1 clock edge signal. Note that the time between the assertion of the PHASE_0 clock edge signal defined by edge 502a and the next assertion of the PHASE_1 clock edge signal defined by edge 504a is less than the time between the assertion of the PHASE_0 clock edge signal defined by edge 502a and the next assertion of the PHASE_0 clock edge signal defined by edge 502b (i.e., the full clock period). It is this principle of using less than the full system clock period to clock at least some of the registers of the pipelined logic that promotes latency compensation.

In the example shown in FIG. 5, in response to an assertion of the PHASE_0 clock edge signal defined by edge 502a, register 302a (FIG. 3) captures and stores exemplary data. This data propagates from the data output of register 302a to the data input of register 302b via logic 304a, which delays the signal propagation. In this example (FIGS. 3 and 5), pipelined logic 300 meets all timing thresholds, such as setup and hold times of registers 302a-302d. Accordingly, in response to the next assertion of the PHASE_1 clock edge signal defined by edge 504a, register 302b captures and stores the exemplary data. This data propagates from the data output of register 302b to the data input of register 302c via logic 304b, which delays the signal propagation. As logic 304b does not delay the data enough to violate timing thresholds in this example, register 302c captures and stores the exemplary data in response to the next assertion of the PHASE_0 clock edge signal defined by edge 502b. This data propagates from the data output of register 302c to the data input of register 302d via logic 304c, which delays the signal propagation. As logic 304c does not delay the data enough to violate timing thresholds in this example, register 302d captures and stores the exemplary data in response to the next assertion of the PHASE_1 clock edge signal defined by rising edge 504b. In this example, applying the low clock frequency (with low voltage supply rail) does not impede pipelined logic 300 from meeting timing thresholds.

In the example described above with regard to FIGS. 3 and 5, in the arbitrary units of time with which the time axis in FIG. 5 is labeled, the total latency ("L") of the data through pipelined logic 300 is somewhat less than 3 time units. However, note that if the above-described latency compensation were not employed in an instance in which the system clock signal is set to the "low" frequency, the total latency of the data through pipelined logic 300 would be three periods of the system clock signal or 6 time units.

Figure 6:
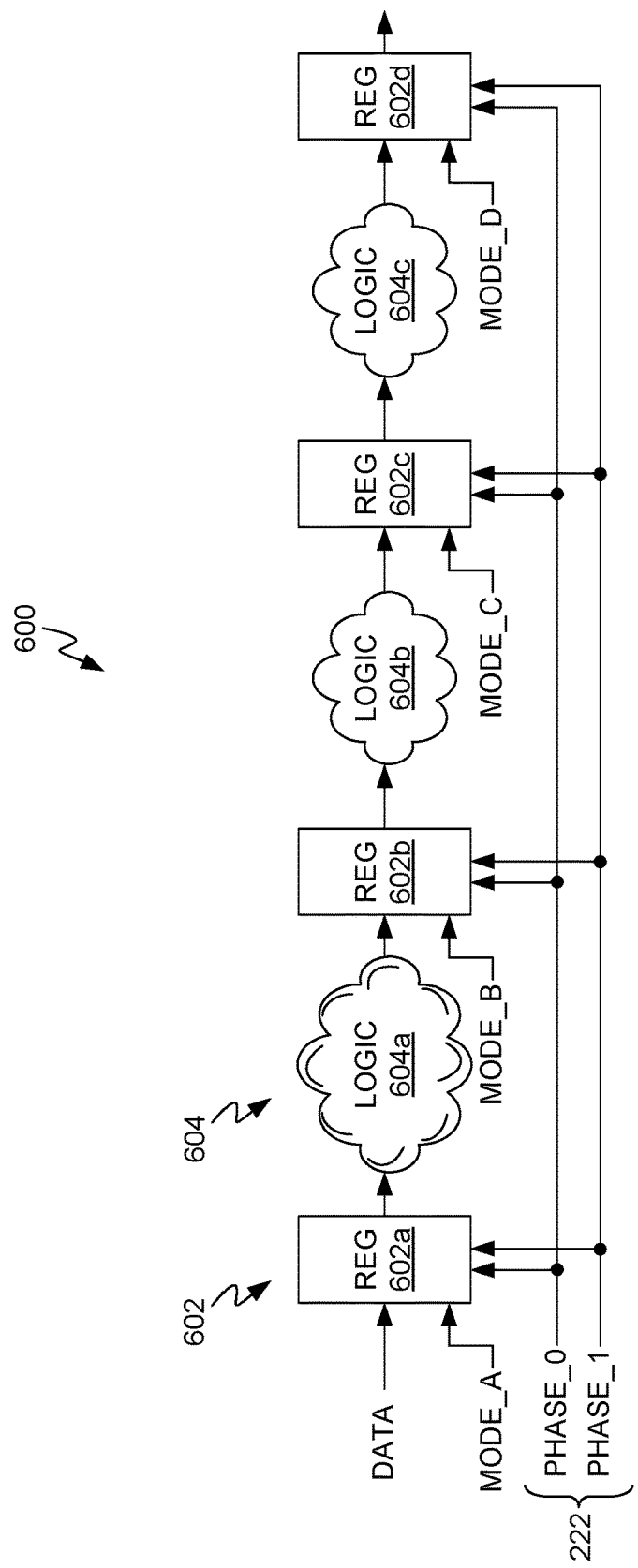
FIG. 6 is similar to FIG. 3, but illustrates at least one register of the pipelined logic having a substantial delay.

Another example of latency compensation may be described with reference to FIGS. 6 and 7. As illustrated in FIG. 6, pipelined logic 600 is similar to above-described pipelined logic 300 (FIG. 3), except that in this example logic 604a substantially delays the data (for example, logic 604a induces a greater delay than logic 604b or logic 604c). Pipelined logic 600 may include any number of registers 602, such as exemplary registers 602a, 602b, 602c, and 602d. Combinational logic 604 may be interposed between pairs of registers 602. For example, logic 604a may be interposed between registers 602a and 602b, logic 604b may be interposed between registers 602b and 602c, and logic 604c may be interposed between registers 602c and 602d. Although in the embodiment shown in FIG. 6, registers 602a-602d comprise D-type flip-flops, in other embodiments the pipelined logic may employ other types of delay elements, such as transparent latches, J-K flip flops, S-R flip flops, toggle flip flops, delay lines, etc.

Figure 7:
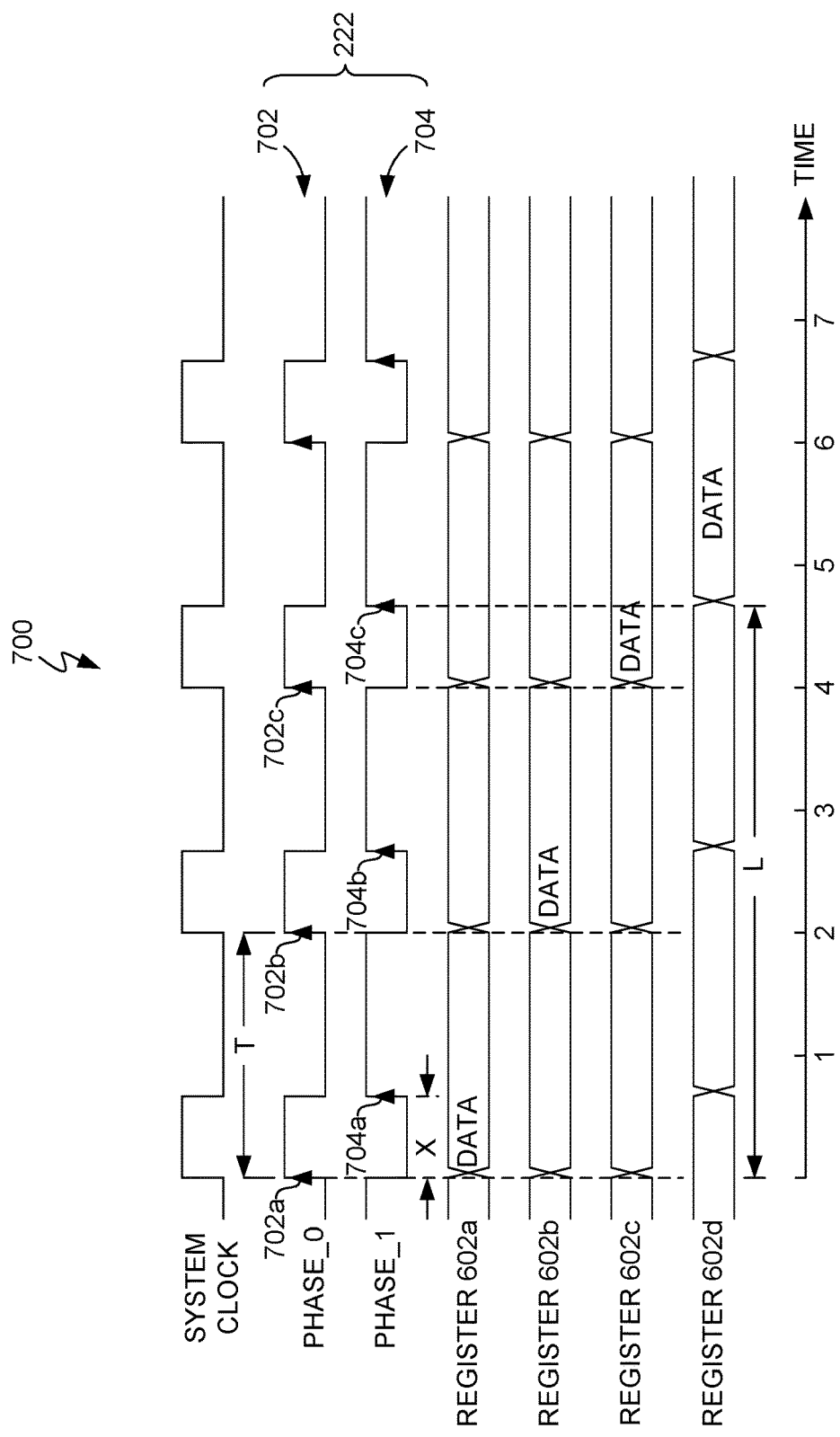
FIG. 7 is a timing diagram, illustrating compensating for system memory latency in a system having the pipelined logic of FIG. 6, in accordance with exemplary embodiments.

In the timing diagram of FIG. 7, exemplary timing 700 may describe an example of operation of one of the systems or components of device 202 (FIG. 2), such as memory interface 214, or a system that is a combination of two or more systems or components, such as client device 218, bus 216, memory interface 214, and memory system 204. The PHASE_0 and PHASE_1 clock edge signals shown in FIG. 7 are similar to those described above with regard to FIG. 5. Accordingly, the identified or true edges of the PHASE_0 clock edge signal are similarly the rising edges 702, such as edge 702a, edge 702b, and edge 702c, and the identified or true edges of the PHASE_1 clock edge signal are the rising edges 704, such as edge 704a, edge 704b, and edge 704c. In response to adjustment of the system clock signal to the low frequency, clock phase controller 212 controls registers 602a and 602c using one of the PHASE_0 and PHASE_1 clock edge signals, such as the PHASE_0 clock edge signal, and controls registers 602b and 602d using the other of the PHASE_0 and PHASE_1 clock edge signals, such as the PHASE_1 clock edge signal.

In the example shown in FIG. 7, in response to an assertion of the PHASE_0 clock edge signal defined by edge 702a, register 302a (FIG. 3) captures and stores exemplary data. This data propagates from the data output of register 702a to the data input of register 702b via logic 604a, which delays the signal propagation. In this example (FIGS. 6-7), logic 604a delays the data enough that if register 602b were to be controlled by the next assertion of the PHASE_1 clock edge signal defined by edge 704a, it would violate timing thresholds of register 602b in this example, and register 602b would likely fail to capture and store the exemplary data. In other words, the time "X" between edge 702a and edge 704a is insufficient to meet the timing threshold requirements. Therefore, instead of the PHASE_1 clock edge signal controlling register 602b, the PHASE_0 clock edge signal is selected to control register 602b, to afford the data additional time to propagate through logic 604a. With the additional time afforded by controlling register 602b using the same one of the clock edge signals (e.g., PHASE_0) as used to control register 602a, the timing thresholds of register 602b are not violated. Thus, in response to the next assertion of the PHASE_0 clock edge signal defined by edge 702b, register 602b captures and stores the exemplary data. This data propagates from the data output of register 602b to the data input of register 602c via logic 604b, which delays the signal propagation. As logic 604b does not delay the data enough to violate timing thresholds in this example, register 602c captures and stores the exemplary data in response to the next assertion of the PHASE_0 clock edge signal defined by edge 702c. This data propagates from the data output of register 602c to the data input of register 602d via logic 604c, which delays the signal propagation. As logic 604c does not delay the data enough to violate timing thresholds in this example, register 602d captures and stores the exemplary data in response to the next assertion of the PHASE_1 clock edge signal defined by rising edge 704c.

In the example described above with regard to FIGS. 6-7, in the arbitrary units of time with which the time axis in FIG. 7 is labeled, the total latency ("L") of the data through pipelined logic 300 is between 4 and 5 time units. However, note that if the above-described latency compensation were not employed in an instance in which the system clock signal is set to the "low" frequency, the total latency of the data through pipelined logic 600 would be three periods of the system clock signal or 6 time units.

Although in the example described above with regard to FIGS. 6-7 the effect of a substantial delay induced by logic 604a may be addressed in the manner described above, in other examples the effect of a substantial delay induced by any other combinational logic or other delay-inducing elements interposed between any one or more pairs of registers could be addressed in the same manner. Each register may be controlled by one of clock edge signals 222 that has been individually selected to ensure the timing requirements of that register are met. Delays and timing requirements may be determined by analyzing a timing analysis report from a circuit synthesis and physical design simulator or timing analyzer (not shown) during a design phase of development of the device 202. The analysis may be performed for every timing path at every frequency and voltage operating condition evaluated across temperature and foundry process variation. For any given path between a source and destination register, the selection of the PHASE_0 or PHASE_1 clock edge signal may be determined by choosing the clock phase which results in the smallest acceptable (i.e. positive slack) timing margin. Commonly, the input to a destination register may be sourced from multiple upstream registers and associated logic paths; it is well understood in digital design that the timing margin must be acceptable (i.e. positive slack) for all paths entering the destination register. This assignment of clock phases may be established at every frequency and voltage operating condition. For example, a high frequency with high voltage condition will have an assignment of clock phases to all registers, and a low frequency with low voltage condition will have an assignment of clock phases to all registers. The overall assignment may be captured in a mode table 1500 shown in FIG.

One embodiment of the mode table 1500 may be fixed at design time and implemented as a static lookup table of the worst-case clock phase assignment(s) using hardwired digital logic or ROM. Alternatively, the mode table 1500 may be implemented using programmable registers, RAM, fuses, EPROM, flash, etc. If the mode table 1500 is programmable, then the clock phase assignments during operation may be further optimized from the initial values determined during the design phase. This is because the clock phase assignments for the hardcoded lookup table must be based on the worst-case process and temperature variation (because the assignment must be reliable across millions of devices and any/all temperatures). However, if the mode table is reprogrammable, then depending on process variation, e.g. slow or fast, the mode table may be adjusted for a particular device, i.e., a fast device which exhibits faster than normal silicon speed may populate the mode table 1500 using clock phase(s) which result in lower latency versus a slow device which exhibits slow than normal silicon speed. The adjustment may be made by determining the silicon speed of an individual device using conventional methods such as ring oscillator speed, leakage current, etc. This results in the lowest possible latency for an individual device. In any case, both the individualized and also the one-size-fits-all (worst case conditions) clock phase assignments will result in a reduced total latency.

Figure 8:
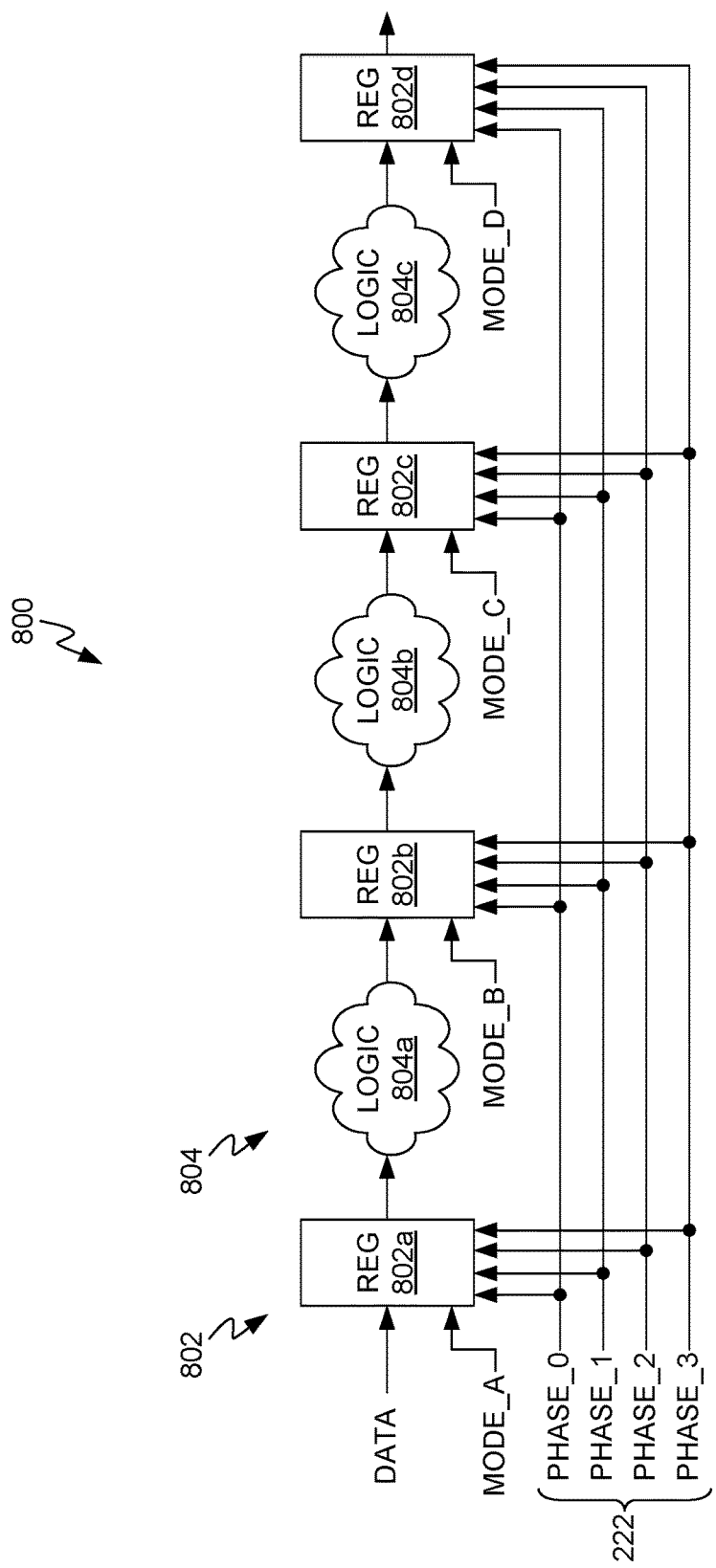
FIG. 8 is a block diagram of pipelined logic provided with phase-delayed system clock signals, in accordance with exemplary embodiments.

Another example of latency compensation may be described with reference to FIGS. 8 and 9. As illustrated in FIG. 8, pipelined logic 800 is similar to above-described pipelined logic 300 (FIG. 3), except that pipelined logic 800 is configured to operate in response to more than two phases of clock edge signals 222. Pipelined logic 800 may include any number of registers 802, such as exemplary registers 802a, 802b, 802c, and 802d. Combinational logic 804 may be interposed between pairs of registers 802. For example, logic 804a may be interposed between registers 802a and 802b, logic 804b may be interposed between registers 802b and 802c, and logic 804c may be interposed between registers 802c and 802d. Although in the embodiment shown in FIG. 8, registers 802a-802d comprise D-type flip-flops, in other embodiments the pipelined logic may employ other types of delay elements, such as transparent latches, J-K flip flops, S-R flip flops, toggle flip flops, delay lines, etc.

Figure 9:
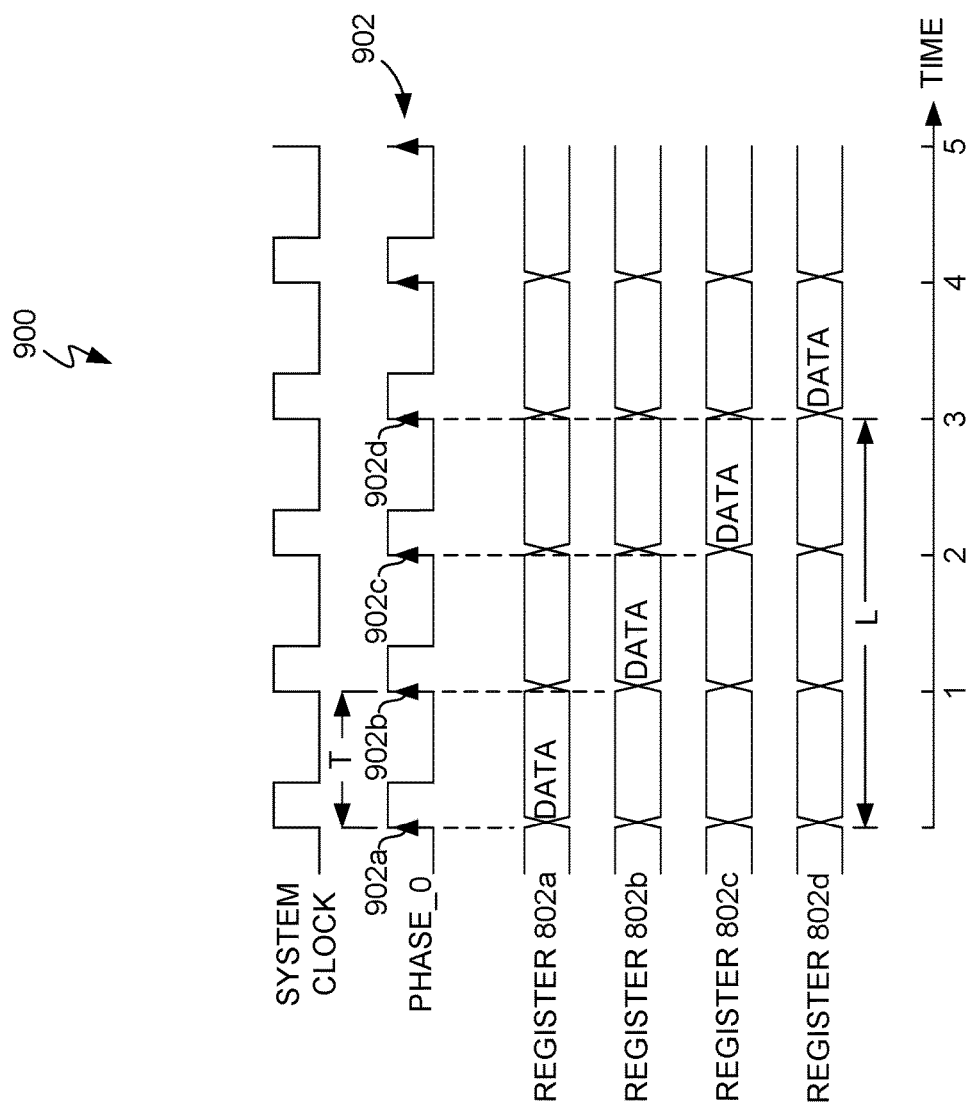
FIG. 9 is a timing diagram, illustrating operation of the pipelined logic of FIG. 8, in accordance with exemplary embodiments.

In the timing diagram of FIG. 9, exemplary timing 900 may describe an example of operation of one of the systems or components of device 202 (FIG. 2), such as memory interface 214, or a system that is a combination of two or more systems or components, such as client device 218, bus 216, memory interface 214, and memory system 204. The PHASE_0 clock edge signal shown in FIG. 9 is similar to that described above with regard to FIG. 4. Accordingly, the frequency of the PHASE_0 clock edge signal may be the "high" frequency to which clock frequency controller 210 set or adjusted the corresponding one of system clock signals 220 ("SYSTEM CLOCK") in response to detection of a high workload demand for client device 218. Likewise, in the example shown in FIG. 9 the identified or true edges of the PHASE_0 clock edge signal are the rising edges 902, such as edge 902a, edge 902b, edge 902c, and edge 902d. In addition to the PHASE_0 clock edge signal, other clock edge signals, such as a PHASE_1 clock edge signal, a PHASE_2 clock edge signal, and a PHASE_3 clock edge signal, may be included in the clock edge signals 222 generated by clock phase controller 212 based on one of the system clocks 220 ("SYSTEM CLOCK"). However, as only one phase of clock edge signals 222 is used in the example of operation shown in FIG. 9, the PHASE_1, PHASE_2, and PHASE_3 clock edge signals are not shown in FIG. 9 for purposes of clarity. It should be noted that although in the exemplary embodiments described in this disclosure up to four phases of clock edge signals 222 are generated, in other exemplary embodiments (not shown) more than four phases of clock edge signals may be generated.

In response to adjustment of the system clock signal to the high frequency, clock phase controller 212 controls all of registers 802 (FIG. 8) using only one of the clock edge signals 222, such as the PHASE_0 clock edge signal. Accordingly, in the example shown in FIGS. 8-9, in response to a first assertion of the PHASE_0 clock edge signal defined by edge 802a, register 802a captures and stores exemplary data ("DATA"). This data propagates from the data output of register 802a to the data input of register 802b via logic 804a, which delays the signal propagation. In this example (FIGS. 3-4), pipelined logic 800 meets all timing thresholds, such as setup and hold times of registers 802a-802d. Accordingly, in response to a second assertion of the PHASE_0 clock edge signal defined by edge 802b, register 802b captures and stores the exemplary data. This data propagates from the data output of register 802b to the data input of register 802c via logic 804b, which delays the signal propagation. As logic 804b does not delay the data enough to violate timing thresholds in this example, register 802c captures and stores the exemplary data in response to a third assertion of the PHASE_0 clock edge signal defined by edge 802c. This data propagates from the data output of register 802c to the data input of register 802d via logic 804c, which delays the signal propagation. As logic 804c does not delay the data enough to violate timing thresholds in this example, register 802d captures and stores the exemplary data in response to a fourth assertion of the PHASE_0 clock edge signal defined by rising edge 402d.

In the example described above with regard to FIGS. 8-9, the total latency of the data through pipelined logic 800 is 3 periods of the PHASE_0 clock edge signal. In the arbitrary units of time with which the time axis in FIG. 9 is labeled, the total latency ("L") of pipelined logic 300 is 3 time units when the frequency of the PHASE_0 clock edge signal is set to the "high" frequency.

Figure 10:
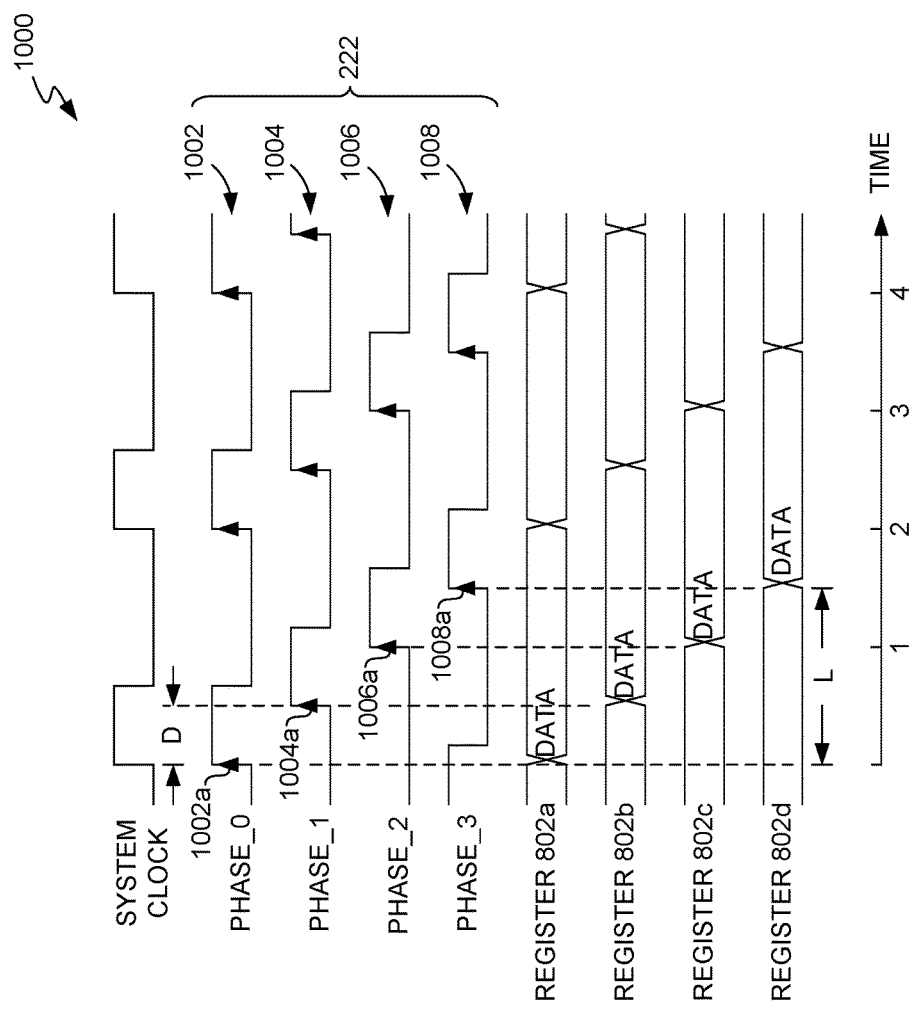
FIG. 10 is similar to FIG. 9, but illustrates compensating for system memory latency when the system clock is set to a lower frequency in a system having the pipelined logic of FIG. 8, in accordance with exemplary embodiments.

In the timing diagram of FIG. 10, exemplary timing 1000 may describe an example of operation of one of the systems or components of device 202 (FIG. 2), such as memory interface 214, or a system that is a combination of two or more systems or components, such as client device 218, bus 216, memory interface 214, and memory system 204. The PHASE_0 clock edge signal shown in FIG. 10 is the same as described above with regard to FIG. 9, except that in the example of operation shown in FIG. 10, the frequency of the PHASE_0 clock edge signal may be the "low" frequency to which clock frequency controller 210 set or adjusted the corresponding one of system clock signals 220 ("SYSTEM CLOCK") in response to detection of a low workload demand for client device 218. The PHASE_0, PHASE_1, PHASE_2, and PHASE_3 clock edge signals have the same frequency as each other but different phases or delays with respect to the relevant one of system clock signals 220. For example, the PHASE_0 clock edge signal may be delayed from the corresponding one of system clock signals 220 by zero, the PHASE_1 clock edge signal may be delayed from the corresponding one of system clock signals 220 by some amount of time delay ("D"), the PHASE_2 clock edge signal may be delayed from the corresponding one of system clock signals 220 by 2×D, and the PHASE_3 clock edge signal may be delayed from the corresponding one of system clock signals 220 by 3×D. In other words, in this example the system clock period may be divided into four phases, having phase delays of 0°, 90°, 180°, and 270° from the system clock. The number of phases may be four because, in this example, pipelined logic 800 has four registers 802. More generally, in pipelined logic 800 having N registers, the clock phase controller 212 may be configured to generate N delayed system clock signals, having a unique phase delay of an integer multiple of 360/N from the relevant system clock signal. Nevertheless, in other embodiments, the number of delayed system clock signals that are generated may be more than or, alternatively, less than the number of registers in the relevant pipelined logic. Also, in other embodiments, the delayed system clock signals may be delayed by any amounts.

In the example shown in FIG. 10 the identified or true edges of the PHASE_0 clock edge signal are the rising edges 1002, such as edge 1002a and edge 1002b; the identified or true edges of the PHASE_1 clock edge signal are the rising edges 1004, such as edge 1004a and edge 1004b; the identified or true edges of the PHASE_2 clock edge signal are the rising edges 1006, such as edge 1006a and edge 1006b; and the identified or true edges of the PHASE_3 clock edge signal are the rising edges 1008, such as edge 1008a and edge 1008b. In the example shown in FIG. 10, in response to adjustment of the system clock signal to the low frequency, clock phase controller 212 controls register 802a using the PHASE_0 clock edge signal, controls register 802b using the PHASE_1 clock edge signal, controls register 802c using the PHASE_2 clock edge signal, and controls register 802d using the PHASE_3 clock edge signal.

In the example shown in FIG. 10, in response to an assertion of the PHASE_0 clock edge signal defined by edge 1002a, register 802a (FIG. 8) captures and stores exemplary data. This data propagates from the data output of register 802a to the data input of register 802b via logic 804a, which delays the signal propagation. In this example (FIGS. 8 and 10), pipelined logic 800 meets all timing thresholds, such as setup and hold times of registers 802a-802d. Accordingly, in response to the next assertion of the PHASE_1 clock edge signal defined by edge 1004a, register 802b captures and stores the exemplary data. This data propagates from the data output of register 802b to the data input of register 802c via logic 304b, which delays the signal propagation. As logic 304b does not delay the data enough to violate timing thresholds in this example, register 802c captures and stores the exemplary data in response to the next assertion of the PHASE_2 clock edge signal defined by edge 1006a. This data propagates from the data output of register 802c to the data input of register 802d via logic 804c, which delays the signal propagation. As logic 804c does not delay the data enough to violate timing thresholds in this example, register 802d captures and stores the exemplary data in response to the next assertion of the PHASE_3 clock edge signal defined by rising edge 1008a.

In the example described above with regard to FIGS. 8 and 10, in the arbitrary units of time with which the time axis in FIG. 10 is labeled, the total latency ("L") of the data through pipelined logic 300 is between 1 and 2 time units. However, note that if the above-described latency compensation were not employed in an instance in which the system clock signal is set to the "low" frequency, the total latency of the data through pipelined logic 300 would be three periods of the system clock signal or 6 time units.

Figure 11:
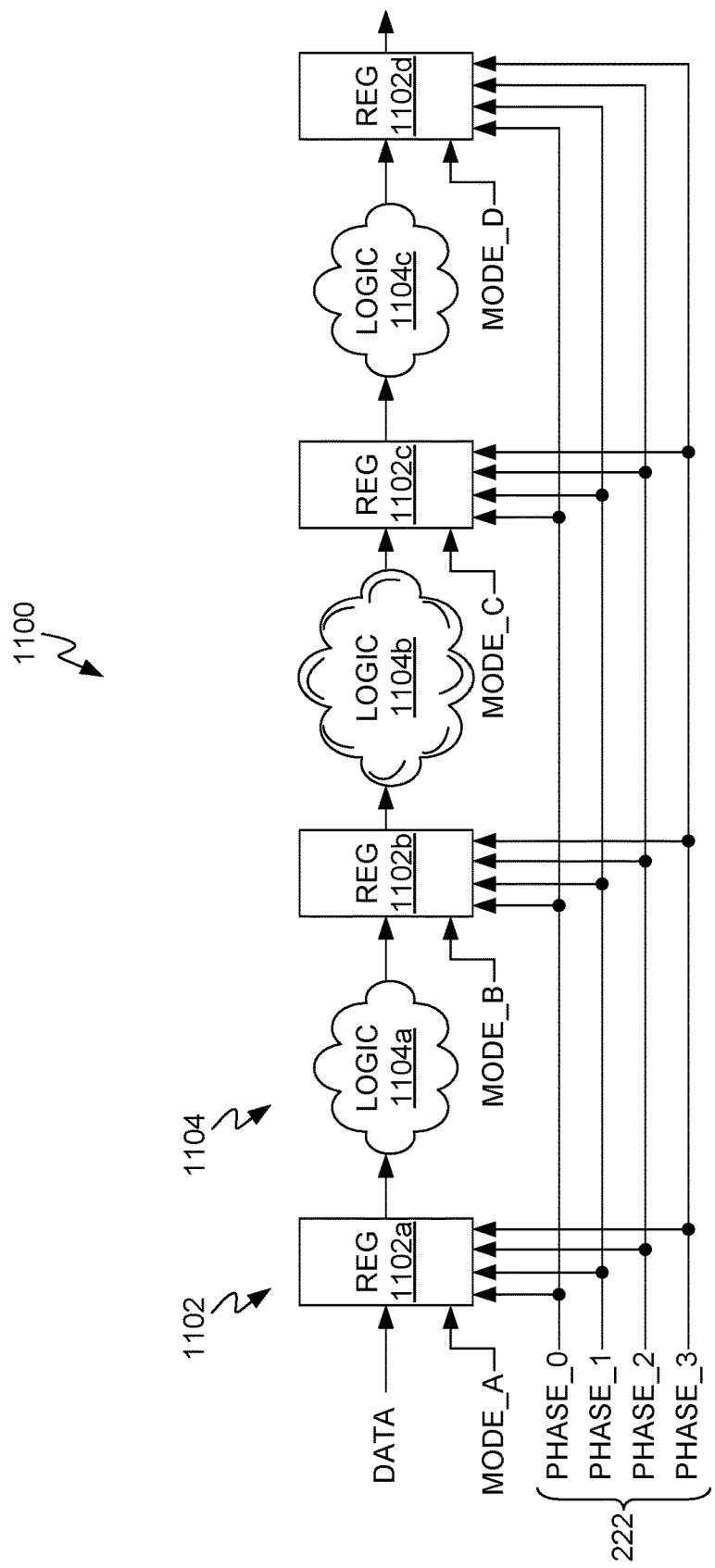
FIG. 11 is a block diagram of pipelined logic having at least one register with a substantial delay provided with phase-delayed system clock signals, in accordance with exemplary embodiments.

Another example of latency compensation may be described with reference to FIGS. 11 and 12. As illustrated in FIG. 11, pipelined logic 1100 is similar to above-described pipelined logic 800 (FIG. 8), except that in this example logic 1104b substantially delays the data (for example, logic 1104b induces a greater delay than logic 1104a or logic 1104c). Pipelined logic 1100 may include any number of registers 1102, such as exemplary registers 1102a, 1102b, 1102c, and 1102d. Combinational logic 1104 may be interposed between pairs of registers 1102. For example, logic 1104a may be interposed between registers 1102a and 1102b, logic 1104b may be interposed between registers 1102b and 1102c, and logic 1104c may be interposed between registers 1102c and 1102d. Although in the embodiment shown in FIG. 11, registers 1102a-1102d comprise D-type flip-flops, in other embodiments the pipelined logic may employ other types of delay elements, such as transparent latches, J-K flip flops, S-R flip flops, toggle flip flops, delay lines, etc.

Figure 12:
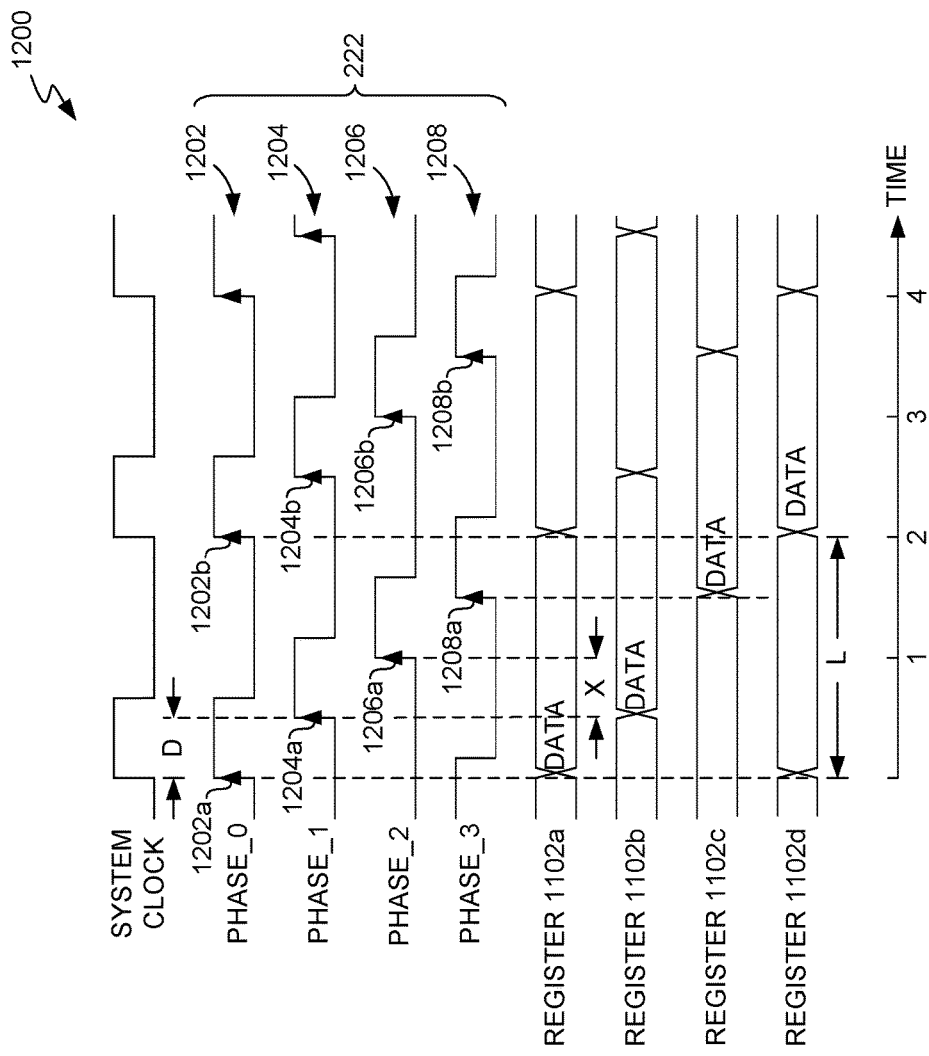
FIG. 12 is a timing diagram, illustrating compensating for system memory latency in a system having the pipelined logic of FIG. 11, in accordance with exemplary embodiments.

In the timing diagram of FIG. 12, exemplary timing 1200 may describe an example of operation of one of the systems or components of device 202 (FIG. 2), such as memory interface 214, or a system that is a combination of two or more systems or components, such as client device 218, bus 216, memory interface 214, and memory system 204. The PHASE_0, PHASE_1, PHASE_2, and PHASE_3 clock edge signals shown in FIG. 12 are similar to those described above with regard to FIG. 10. Accordingly, the identified or true edges of the PHASE_0 clock edge signal are similarly the rising edges 1202, such as edge 1202a and edge 1202b, the identified or true edges of the PHASE_1 clock edge signal are the rising edges 1204, such as edge 1204a and edge 1204b, the identified or true edges of the PHASE_2 clock edge signal are the rising edges 1206, such as edge 1206a and edge 1206b, and the identified or true edges of the PHASE_3 clock edge signal are the rising edges 1208, such as edge 1208a and edge 1208b. In response to adjustment of the system clock signal to the low frequency, clock phase controller 212 controls register 1102c (FIG. 11) differently than it controls registers 1102a, 1102b, and 1102c because in this example logic 1104b substantially delays the data.

In the example shown in FIG. 12, in response to an assertion of the PHASE_0 clock edge signal defined by edge 1202a, register 1102a (FIG. 11) captures and stores exemplary data. This data propagates from the data output of register 1102a to the data input of register 1102b via logic 1104a. As logic 1104a does not delay the data enough to violate timing thresholds in this example, register 1102b captures and stores the exemplary data in response to the next assertion of the PHASE_1 clock edge signal defined by edge 1204a. This data propagates from the data output of register 1102b to the data input of register 1102c via logic 1104b, which delays the signal propagation. In this example (FIGS. 11-12), logic 1104b delays the data enough that if register 1102c were to be controlled by the next assertion of the PHASE_2 clock edge signal defined by edge 1206a, it would violate timing thresholds of register 1102c in this example, and register 1102c would likely fail to capture and store the exemplary data. In other words, the time "X" between edge 1204a and edge 1206a is insufficient to meet the timing threshold requirements. Therefore, instead of the PHASE_2 clock edge signal controlling register 1102c, the PHASE_3 clock edge signal is selected to control register 1102c, to afford the data additional time to propagate through logic 1104b. With the additional time, the timing thresholds of register 1102c are not violated. Thus, in response to the next assertion of the PHASE_3 clock edge signal defined by edge 1208a, register 1102c captures and stores the exemplary data. This data propagates from the data output of register 1102c to the data input of register 1102d via logic 1104c. As logic 1104c does not delay the data enough to violate timing thresholds in this example, register 1102d captures and stores the exemplary data in response to the next assertion of the PHASE_0 clock edge signal defined by edge 1202b.

In the example described above with regard to FIGS. 11-12, in the arbitrary units of time with which the time axis in FIG. 12 is labeled, the total latency ("L") of the data through pipelined logic 1200 is 2 time units. However, note that if the above-described latency compensation were not employed in an instance in which the system clock signal is set to the "low" frequency, the total latency of the data through pipelined logic 1100 would be three periods of the system clock signal or 6 time units.

Although in the example described above with regard to FIGS. 11-12 the effect of a substantial delay induced by logic 1104b may be addressed in the manner described above, in other examples the effect of a substantial delay induced by any other combinational logic or other delay-inducing elements interposed between any one or more pairs of registers could be addressed in the same manner. Each register may be controlled by one of clock edge signals 222 that has been individually selected to ensure the timing requirements of that register are met. Delays and timing requirements may be determined by analyzing a timing analysis report from a simulator (not shown) during a design phase of development of the device 202. For example, a first subset of one or more of registers 1102a-1102d may be controlled by a first one of clock edge signals 222 having a first phase delay from the relevant system clock, a second subset of one or more of registers 1102a-1102d may be controlled by a second one of clock edge signals 222 having a second phase delay from the relevant system clock, a third subset of one or more of registers 1102a-1102c may be controlled by a third one of clock edge signals 222 having a third phase delay from the relevant system clock, etc. More generally, two respective delayed system clock signals having a first phase difference or time delay between them may be used to control at least any first pair of pipelined registers (e.g., a pair between which the data is insubstantially delayed), and two respective delayed system clock signals having a second phase difference or time delay between them (i.e., the second being greater than the first) may be used to control at least any second pair of pipelined registers (e.g., a pair between which the data is substantially delayed).

Figure 13:
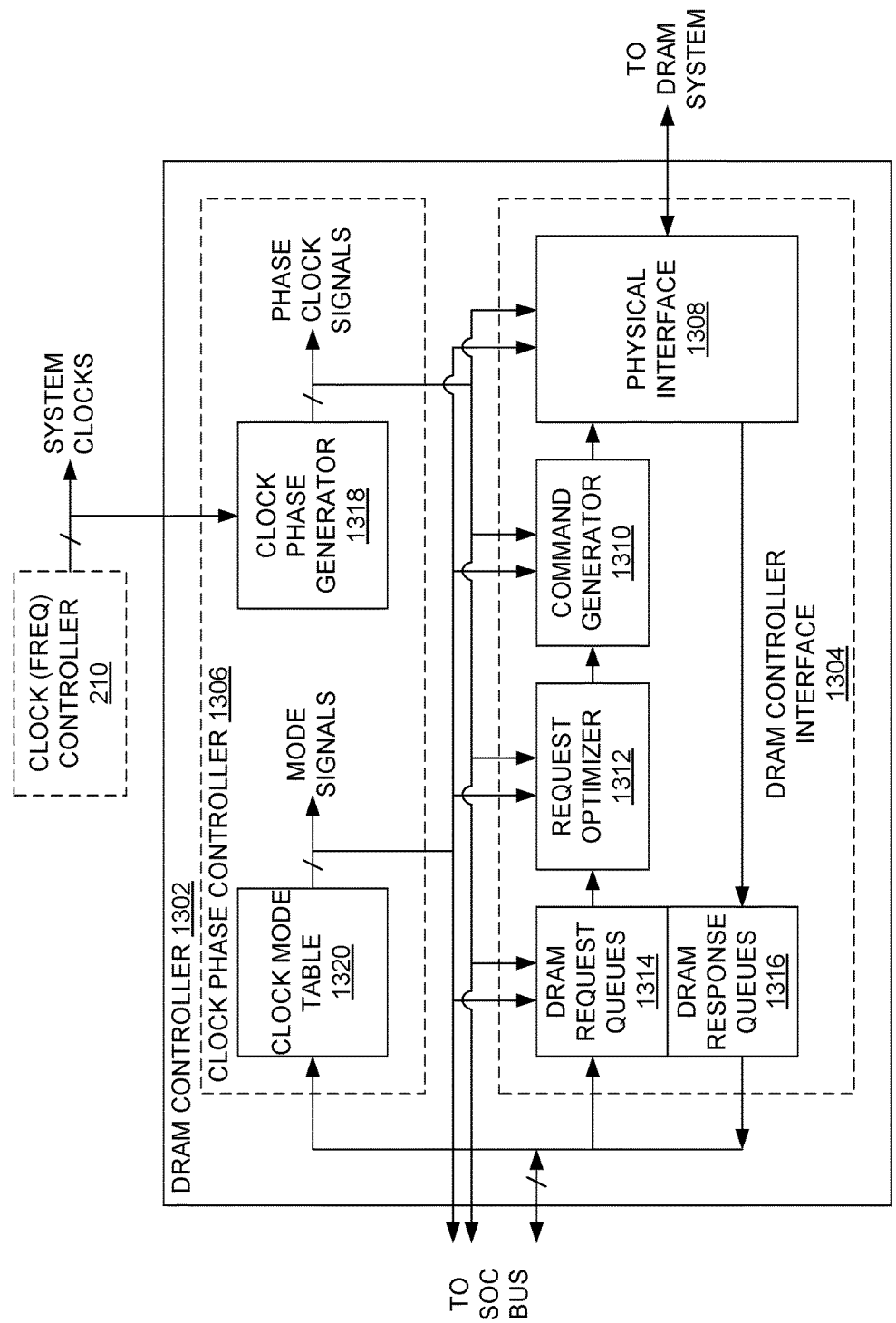
FIG. 13 is a block diagram of a DRAM controller, in accordance with exemplary embodiments.

In exemplary embodiments, aspects of clock phase controller 212 and memory interface 214 (FIG. 2), may be integrated together within a single system or device. For example, as illustrated in FIG. 13, a DRAM controller 1302 may include both a clock phase controller 1306, which may be an example of clock phase controller 212, and a DRAM controller interface 1304, which may be an example of memory interface 214. DRAM controller 1302 may receive one or more system clock signals that are generated by clock frequency controller 210 in the manner described above (e.g., adjusted in frequency in response to client device workload demand). DRAM controller 1302 may be coupled to an SoC bus, such as bus 216 (FIG. 2). DRAM controller interface 1304 may be coupled to a DRAM system, such as memory system 204 (FIG. 2). DRAM controller interface 1304 may have a conventional structure, and may include, for example, a physical interface 1308, a command generator 1310, a request optimizer 1312, DRAM request queues 1314, and DRAM response queues 1316.

Clock phase controller 1306 may include a clock phase generator 1318 and a clock mode table 1320. Clock phase generator 1318 may generate delayed system clock signals or phase clock signals, such as the PHASE_0, PHASE_1, PHASE_2, and PHASE_3 clock edge signals described above with regard to FIGS. 3-12. Each of the generated phase clock signals may be provided to pipelined logic in DRAM controller interface 1304. As such pipelined logic may include physical interface 1308, command generator 1310, request optimizer 312, DRAM request queues 1314, and DRAM response queues 1316, each of which may itself include multiple pipelined logic stages, it may be appreciated that data may take many clock cycles to propagate through DRAM controller interface 1304. It may also be appreciated that some of the elements of DRAM controller interface 1304 may have longer delays than other elements. For example, DRAM request queues 1314 and DRAM response queues 1316 may have low logic delays, whereas request optimizer 1312 may have a high logic delay. Therefore, in a system such as DRAM controller interface 1304 comprising a combination of elements having high logic delays and elements having low logic delays, it may be beneficial to control each element using an individually selected one of two or more phase clock signals.

Clock mode table 1320 may associate each element of the pipelined logic, or a group of multiple elements of the pipelined logic, with one of the different phase clock signals or other clock edge signals, to be used when the system is operating in a low frequency mode (e.g., in response to detection of a low client device workload). In the examples described above with regard to FIGS. 3-5, clock mode table 1320 may associate registers 302a and 302c with the PHASE_0 clock edge signal and associate registers 302b and 302d with the PHASE_1 clock edge signal. In the example described above with regard to FIGS. 6-7, clock mode table 1320 may associate registers 602a, 602c, and 602d with the PHASE_0 clock edge signal and associate register 602b with the PHASE_1 clock edge signal. In the example described above with regard to FIG. 8 and FIG. 10, clock mode table 1320 may associate register 802a with the PHASE_0 clock edge signal, associate register 802b with the PHASE_1 clock edge signal, associate register 802c with the PHASE_2 clock edge signal, and associate register 802d with the PHASE_3 clock edge signal. In the examples described above with regard to FIGS. 11-12, clock mode table 1320 may associate register 1102a with the PHASE_0 clock edge signal, associate register 1102b with the PHASE_1 clock edge signal, associate register 1102c with the PHASE_ 3 clock edge signal, and associate register 1102d with the PHASE_0 clock edge signal.

Clock mode table 1320 may be a lookup table in which the above-described associations are stored. Alternatively, clock mode table 1320 have any other structure, such as using reconfigurable registers, RAM, ROM, EPROM, or other type of NV storage. The above-described mode table 1500 (FIG. 15) may be an example of clock mode table 1320. Clock mode table 1320 may generate mode control signals indicating the above-described associations. The mode control signals may be provided to the elements of the pipelined logic. In other words, clock mode table 1320 indicates to each register or other element of pipelined logic which of two or more phase clock signals is to be used when the system is operating in a low-frequency mode. In the examples described above with regard to FIG. 3, register 302a is provided with mode control signal MODE_A, register 302b is provided with mode control signal MODE_B, register 302c is provided with mode control signal MODE_C, and register 302d is provided with mode control signal MODE_D. In the examples described above with regard to FIG. 3, each of these mode control signals may consist of one only bit to enable selection from among the two phase clock signals in those examples. Similarly, in the examples described above with regard to FIG. 6, register 602a is provided with mode control signal MODE_A, register 602b is provided with mode control signal MODE_B, register 602c is provided with mode control signal MODE_C, and register 602d is provided with mode control signal MODE_D. In the examples described above with regard to FIG. 6, each of these mode control signals may consist of one only bit to enable selection from among the two phase clock signals in those examples. In the examples described above with regard to FIG. 8, register 802a is provided with mode control signal MODE_A, register 802b is provided with mode control signal MODE_B, register 802c is provided with mode control signal MODE_B, register 802c is provided with mode control signal MODE_ C, and register 802d is provided with mode control signal MODE_D. In the examples described above with regard to FIG. 8, each of these mode control signals may consist of two bits to enable selection from among the four phase clock signals in those examples. Similarly, in the examples described above with regard to FIG. 11, at low frequency, register 1102a is provided with mode control signal MODE_A, which, using the mode table 1500, is equal to the binary value 00 determined by row 1550 (Block0_reg_1102a) and column 1502 ($f_{Low}$ mode). Register 1102b is provided with mode control signal MODE_B, which, using the mode table 1500, is equal to the binary value 01 determined by row 1551 (Block0_reg_1102b) and column 1503 ($f_{LOW}$ mode). Register 1102c is provided with mode control signal MODE_C, which, using the mode table 1500, is equal to the binary value 11 determined by row 1552 (Block0_reg_1102c) and column 1503 ($f_{LOW}$ mode). Register 1102d is provided with mode control signal MODE_D, which, using the mode table 1500, is equal to the binary value 00 determined by row 1553 (Block0_reg_1102d) and column 1503 ($f_{LOW}$ mode). This is repeated for every register employing latency compensation and for each frequency and voltage rail operating point. For example, mode table 1500 includes a low frequency operating point defined by columns 1502 and 1503, a mid frequency operating point defined by columns 1504 and 1505, and a high frequency operating point defined by columns 1506 and 1507. As described above, the voltage rail may be particular to the respective frequency operating. For a given frequency and voltage rail operating point, the applicable mode (columns 1503, 1505, 1507) is applied, which results in selecting the proper clock phase (columns 1502, 1504, 1506).

In the examples described above with regard to FIG. 11, each of the mode control signals may consist of a 2-bit binary value to enable selection from among the four phase clock signals in those examples. Although in the exemplary embodiments described in this disclosure each element of pipelined logic receives two or more phase clock signals and at least one mode control signal, in still other embodiments each element of pipelined logic could receive only a single clock signal that has been pre-selected or generated by a clock phase controller. Still other arrangements for controlling pipelined logic registers using phase clock signals or other types of periodic clock edge signals to compensate for pipelined logic latency will occur to one of ordinary skill in the art in view of the descriptions in this disclosure.

Figure 14:
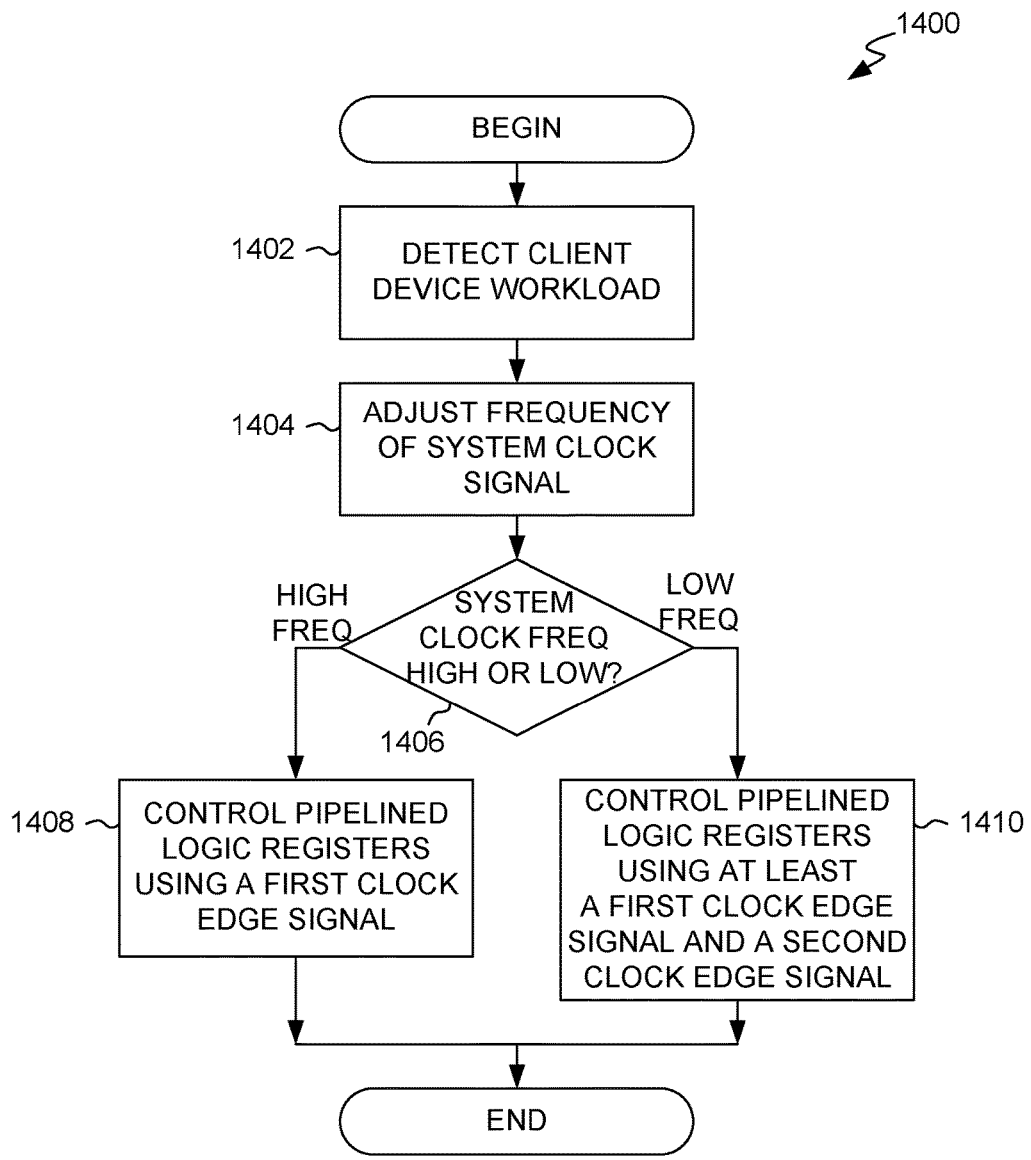
FIG. 14 is a method flow diagram, illustrating an exemplary method for compensating for system memory latency, in accordance with exemplary embodiments.

An exemplary method 1400 for compensating for system memory latency is illustrated in FIG. 14. As indicated by block 1402, method 1400 may include detecting client device workload demand. Client device workload demand may be detected in any manner. Conventional techniques for detecting client device workload demand are known to one of ordinary skill in the art such as hardware monitoring of CPU bus traffic, CPU utilization, CPU current, CPU temperature, etc. Power controller 208 (FIG. 2) and clock frequency controller 210 are examples of elements that may serve as a means for performing this function. As indicated by block 1404, method 1400 may include adjusting a frequency of a system clock signal provided to system components, such as the client device, memory interface, memory system, etc. For example, conventional DVFS techniques may be employed to adjust the system clock signal to a first frequency in response to detection of a high client device workload demand and adjust the system clock signal to a second frequency lower than the first frequency in response to detection of a low client device workload demand. Along with the change in clock frequency there may also be a change in power supply rail voltage (e.g., voltage reduced when clock frequency is reduced, and vice versa). Clock frequency controller 210 is an example of an element that may serve as a means for performing this function.

Block 1406 indicates that certain actions that follow depend upon whether the system clock signal has been adjusted to the first frequency or the second frequency. As indicated by block 1408, in response to adjustment of the system clock signal to the first frequency, at least one pair of (i.e., first and second) registers of pipelined logic are controlled using a first periodic clock edge signal. As indicated by block 1410, in response to adjustment of the system clock signal to the second frequency, in at least one pair of (i.e., first and second) registers of the pipelined logic, the first register is controlled using one of the first periodic clock edge signal and a second periodic clock edge signal, and the second register is controlled using the other of the first periodic clock edge signal and the second periodic clock edge signal. Clock phase controller 212 is an example of an element that may serve as a means for performing these functions.

The first and second periodic clock edge signals are related in that a first periodic time interval between successive assertions (e.g., identified edges) of the first clock edge signal is greater than a second periodic time interval between an assertion of the first periodic clock edge signal and the next assertion of the second periodic clock edge signal. Because the next assertion of the second periodic clock edge signal following the assertion of the first periodic clock edge signal occurs before the next assertion of the first periodic clock edge signal, the time between the assertion of the first periodic clock edge signal and the next assertion of the second periodic clock edge signal is less than the time between the assertion of the first periodic clock edge signal and the next assertion of the first periodic clock edge signal. Thus, when the system clock signal has been adjusted to the second (low) frequency, controlling a register using the next assertion of the second periodic clock edge signal instead of waiting for the next assertion of the first periodic clock edge signal reduces latency through the pipelined logic.

Aspects of exemplary methods described in this disclosure, including method 400, may be performed under control of one or more processors, such as CPU 104 (FIG. 1). The processors may be configured with software, firmware, code, instructions, etc., or other computer-executable logic to perform the methods for compensating for system memory latency described herein. Such computer-executable logic may be stored in one or more computer-readable media, such as SRAM 128 (FIG. 1) or a non-volatile memory. The combination of computer-executable logic and the non-transitory media in which the logic is stored generally defines what is referred to in the patent lexicon as a "computer program product."

Alternative embodiments will become apparent to one of ordinary skill in the art to which the invention pertains without departing from its spirit and scope. Therefore, although selected aspects have been illustrated and described in detail, it will be understood that various substitutions and alterations may be made therein without departing from the spirit and scope of the present invention, as defined by the following claims.

What is claimed is:

1. A system for compensating for system memory latency, comprising:
    a memory interface between a client device and a memory system, the memory interface having pipelined logic including a first register and a second register, a data input of the second register pipelined to a data output of the first register;
    a clock frequency controller configured to detect client device workload demand and to adjust a frequency of a system clock signal provided to the memory interface, the clock frequency controller adjusting the system clock signal to a first frequency in response to detection of a high client device workload demand and adjusting the system clock signal to a second frequency lower than the first frequency in response to detection of a low client device workload demand; and a clock phase controller configured to, in response to adjustment of the system clock signal to the first frequency, control the first and second registers using a first periodic clock edge signal, the clock phase controller further configured to, in response to adjustment of the system clock signal to the second frequency, control the first register using one of the first periodic clock edge signal and a second periodic clock edge signal and control the second register using another of the first periodic clock edge signal and the second periodic clock edge signal, wherein a first periodic time interval between successive assertions of the first periodic clock edge signal is greater than a second periodic time interval between an assertion of the first periodic clock edge signal and a next assertion of the second periodic clock edge signal following the assertion of the first periodic clock edge signal, and wherein the first periodic clock edge signal corresponds to successive assertions of a true edge of the system clock signal, and the second periodic clock edge signal corresponds to successive assertions of a true edge of a delayed system clock signal having a phase delay from the system clock signal greater than or equal to zero and less than 360 degrees.

2. The system of claim 1, wherein:
the first periodic clock edge signal corresponds to successive assertions of a true edge of the system clock signal; and
the second periodic clock edge signal corresponds to successive assertions of a complement edge of the system clock signal.

3. The system of claim 2, wherein:
the pipelined logic comprises three or more registers including one or more odd registers and one or more even registers, and a data input of each odd register is pipelined to a data output of one of the even registers; and
the clock phase controller is configured to, in response to adjustment of the system clock signal to the first frequency, control the odd and even registers using the first periodic clock edge signal, and the clock phase controller is further configured to, in response to adjustment of the system clock signal to the second frequency, control the odd registers using the first periodic clock edge signal and control the even registers using the second periodic clock edge signal.

4. The system of claim 2, wherein:
the pipelined logic comprises three or more registers; and
the clock phase controller is configured to, in response to adjustment of the system clock signal to the first frequency, control each of the registers using the first periodic clock edge signal, and the clock phase controller is further configured to, in response to adjustment of the system clock signal to the second frequency, control a first subset of the registers using the first periodic clock edge signal and control a second subset of the registers using the second periodic clock edge signal, and at least one pair of pipelined registers is controlled by a same one of the first and second periodic clock edge signals.

5. The system of claim 1, wherein:
the pipelined logic comprises three or more ("N") registers; and
the clock phase controller is configured to generate N delayed system clock signals, each delayed system clock signal having a unique phase delay of an integer multiple of 360/N from the system clock signal, and the clock phase controller is further configured to, in response to adjustment of the system clock signal to the first frequency, control each of the N registers using the system clock signal, and configured to, in response to adjustment of the system clock signal to the second frequency, control each of the N registers using one of the N delayed system clock signals.

6. The system of claim 1, wherein:
the pipelined logic comprises three or more registers; and
the clock phase controller is configured to generate a plurality of delayed system clock signals, each delayed system clock signal having a unique phase delay from the system clock signal, and the clock phase controller is further configured to, in response to adjustment of the system clock signal to the first frequency, control each of the registers using the system clock signal, and configured to, in response to adjustment of the system clock signal to the second frequency, control a first pair of pipelined registers using two respective delayed system clock signals having a first phase difference and control a second pair of pipelined registers using two respective delayed system clock signals having a second phase difference different than the first phase difference.

7. The system of claim 1, wherein the clock phase controller comprises:
a clock phase generator configured to generate a plurality of different clock signals based on the system clock signal, and to provide the different clock signals to each element of the pipelined logic including the first and second registers; and
a mode table configured to generate mode control signals indicating an association between each element of the pipelined logic and one of the different clock signals, and to provide the mode control signals to each element of the pipelined logic.

8. The system of claim 1, wherein the memory interface comprises a dynamic random access memory ("DRAM") controller.

9. The system of claim 1, wherein the client device and the memory interface are included in a system-on-chip ("SoC") of a portable computing device.

10. A system for compensating for system memory latency, comprising:
means for detecting client device workload demand associated with a client device, the client device interfaced with a memory system by a memory interface having pipelined logic including a first register and a second register;
means for adjusting a frequency of a system clock signal provided to the memory interface, the means for adjusting the system clock signal adjusting the system clock signal to a first frequency in response to detection of a high client device workload demand and adjusting the system clock signal to a second frequency lower than the first frequency in response to detection of a low client device workload demand;
means for, in response to adjustment of the system clock signal to the first frequency, controlling the first and second registers using a first periodic clock edge signal; and
means for, in response to adjustment of the system clock signal to the second frequency, controlling the first register using one of the first periodic clock edge signal and a second periodic clock edge signal, and controlling the second register using another of the first periodic clock edge signal and the second periodic clock edge signal, wherein a first periodic time interval between successive assertions of the first periodic clock edge signal is greater than a second periodic time interval between an assertion of the first periodic clock edge signal and a next assertion of the second periodic clock edge signal following the assertion of the first periodic clock edge signal, and wherein the first periodic clock edge signal corresponds to successive assertions of a true edge of the system clock signal, and the second periodic clock edge signal corresponds to successive assertions of a true edge of a delayed system clock signal having a phase delay from the system clock signal greater than or equal to zero and less than 360 degrees.

11. The system of claim 10, wherein:
the first periodic clock edge signal corresponds to successive assertions of a true edge of the system clock signal; and
the second periodic clock edge signal corresponds to successive assertions of a complement edge of the system clock signal.

12. The system of claim 11, wherein:
the pipelined logic comprises three or more registers including one or more odd registers and one or more even registers, and a data input of each odd register is pipelined to a data output of one of the even registers;
the means for controlling, in response to adjustment of the system clock signal to the first frequency, comprises means for controlling the odd and even registers using the first periodic clock edge signal; and
the means for controlling, in response to adjustment of the system clock signal to the second frequency, comprises means for controlling the odd registers using the first periodic clock edge signal and controlling the even registers using the second periodic clock edge signal.

13. The system of claim 11, wherein:
the pipelined logic comprises three or more registers;
the means for controlling, in response to adjustment of the system clock signal to the first frequency, comprises means for controlling each of the registers using the first periodic clock edge signal; and
the means for controlling, in response to adjustment of the system clock signal to the second frequency, comprises means for controlling a first subset of the registers using the first periodic clock edge signal and controlling a second subset of the registers using the second periodic clock edge signal, and at least one pair of pipelined registers is controlled by a same one of the first and second periodic clock edge signals.

14. The system of claim 10, wherein:
the pipelined logic comprises three or more ("N") registers; and
the means for controlling, in response to adjustment of the system clock signal to the first frequency, comprises means for controlling each of the N registers using the system clock signal; and
the means for controlling, in response to adjustment of the system clock signal to the second frequency, comprises means for generating N delayed system clock signals, each delayed system clock signal having a unique phase delay of an integer multiple of 360/N from the system clock signal, and in response to adjustment of the system clock signal to the second frequency controlling each of the N registers using one of the N delayed system clock signals.

15. The system of claim 10, wherein:
the pipelined logic comprises three or more registers; and
the means for controlling, in response to adjustment of the system clock signal to the first frequency, comprises means for controlling each of the registers using the system clock signal; and
the means for controlling, in response to adjustment of the system clock signal to the second frequency, comprises means for generating a plurality of delayed system clock signals, each delayed system clock signal having a unique phase delay from the system clock signal, and in response to adjustment of the system clock signal to the second frequency controlling a first pair of pipelined registers using two respective delayed system clock signals having a first phase difference and controlling a second pair of pipelined registers using two respective delayed system clock signals having a second phase difference different than the first phase difference.

16. The system of claim 10, wherein the means for controlling, in response to adjustment of the system clock signal to the second frequency, comprises:
a clock phase generator configured to generate a plurality of different clock signals based on the system clock signal, and to provide the different clock signals to each element of the pipelined logic including the first and second registers; and
a mode table configured to generate mode control signals indicating an association between each element of the pipelined logic and one of the different clock signals, and to provide the mode control signals to each element of the pipelined logic.

17. The system of claim 10, wherein the client device and the memory interface are included in a system-on-chip ("SoC") of a portable computing device.

18. A method for compensating for system memory latency, the system comprising:
detecting client device workload demand associated with a client device, the client device interfaced with a memory system by a memory interface having pipelined logic including a first register and a second register;
adjusting a frequency of a system clock signal provided to the memory interface, wherein the system clock signal is adjusted to a first frequency in response to detection of a high client device workload demand, and the system clock signal is adjusted to a second frequency lower than the first frequency in response to detection of a low client device workload demand;
controlling, in response to adjustment of the system clock signal to the first frequency, the first and second registers using a first periodic clock edge signal; and
controlling, in response to adjustment of the system clock signal to the second frequency, the first register using one of the first periodic clock edge signal and a second periodic clock edge signal, and the second register using another of the first periodic clock edge signal and the second periodic clock edge signal, wherein a first periodic time interval between successive assertions of the first periodic clock edge signal is greater than a second periodic time interval between an assertion of the first periodic clock edge signal and a next assertion of the second periodic clock edge signal following the assertion of the first periodic clock edge signal, and wherein the first periodic clock edge signal corresponds to successive assertions of a true edge of the system clock signal, and the second periodic clock edge signal corresponds to successive assertions of a true edge of a delayed system clock signal having a phase delay from the system clock signal greater than or equal to zero and less than 360 degrees.

19. The method of claim 18, wherein:
the first periodic clock edge signal corresponds to successive assertions of a true edge of the system clock signal; and
the second periodic clock edge signal corresponds to successive assertions of a complement edge of the system clock signal.

20. The method of claim 19, wherein:
the pipelined logic comprises three or more registers including one or more odd registers and one or more even registers, and a data input of each odd register is pipelined to a data output of one of the even registers; and
controlling, in response to adjustment of the system clock signal to the first frequency, comprises controlling the odd and even registers using the first periodic clock edge signal; and
controlling, in response to adjustment of the system clock signal to the second frequency, comprises controlling the odd registers using the first periodic clock edge signal and control the even registers using the second periodic clock edge signal.

21. The method of claim 19, wherein:
the pipelined logic comprises three or more registers;
controlling, in response to adjustment of the system clock signal to the first frequency, comprises controlling each of the registers using the first periodic clock edge signal; and
controlling, in response to adjustment of the system clock signal to the second frequency, comprises controlling a first subset of the registers using the first periodic clock edge signal and controlling a second subset of the registers using the second periodic clock edge signal, and at least one pair of pipelined registers is controlled by a same one of the first and second periodic clock edge signals.

22. The method of claim 18, wherein:
the pipelined logic comprises three or more ("N") registers; and
controlling, in response to adjustment of the system clock signal to the second frequency, comprises generating N delayed system clock signals, each delayed system clock signal having a unique phase delay of an integer multiple of 360/N from the system clock signal, and in response to adjustment of the system clock signal to the first frequency controlling each of the N registers using the system clock signal, and in response to adjustment of the system clock signal to the second frequency controlling each of the N registers using one of the N delayed system clock signals.

23. The method of claim 18, wherein:
the pipelined logic comprises three or more registers; and
controlling, in response to adjustment of the system clock signal to the second frequency, comprises generating a plurality of delayed system clock signals, each delayed system clock signal having a unique phase delay from the system clock signal, and in response to adjustment of the system clock signal to the first frequency controlling each of the registers using the system clock signal, and in response to adjustment of the system clock signal to the second frequency controlling a first pair of pipelined registers using two respective delayed system clock signals having a first phase difference and control a second pair of pipelined registers using two respective delayed system clock signals having a second phase difference different than the first phase difference.

24. The method of claim 18, wherein controlling, in response to adjustment of the system clock signal to the second frequency, comprises:
generating a plurality of different clock signals based on the system clock signal, and to provide the different clock signals to each element of the pipelined logic including the first and second registers; and
generating mode control signals indicating an association between each element of the pipelined logic and one of the different clock signals, and providing the mode control signals to each element of the pipelined logic.

25. A computer program product for compensating for system memory latency, the computer program product comprising processor-executable logic embodied in at least one non-transitory storage medium, execution of the logic by one or more processors of a system configuring the system to:
detect client device workload demand associated with a client device, the client device interfaced with a memory system by a memory interface having pipelined logic including a first register and a second register;
adjust a frequency of a system clock signal provided to the memory interface, wherein the system clock signal is adjusted to a first frequency in response to detection of a high client device workload demand, and the system clock signal is adjusted to a second frequency lower than the first frequency in response to detection of a low client device workload demand;
control, in response to adjustment of the system clock signal to the first frequency, the first and second registers using a first periodic clock edge signal; and
control, in response to adjustment of the system clock signal to the second frequency; the first register using one of the first periodic clock edge signal and a second periodic clock edge signal, and the second register using another of the first periodic clock edge signal and the second periodic clock edge signal, wherein a first periodic time interval between successive assertions of the first periodic clock edge signal is greater than a second periodic time interval between an assertion of the first periodic clock edge signal and a next assertion of the second periodic clock edge signal following the assertion of the first periodic clock edge signal, and wherein the first periodic clock edge signal corresponds to successive assertions of a true edge of the system clock signal, and the second periodic clock edge signal corresponds to successive assertions of a true edge of a delayed system clock signal having a phase delay from the system clock signal greater than or equal to zero and less than 360 degrees.

26. The computer program product of claim 25, wherein:
the first periodic clock edge signal corresponds to successive assertions of a true edge of the system clock signal;
the second periodic clock edge signal corresponds to successive assertions of a complement edge of the system clock signal;
the pipelined logic comprises three or more registers including one or more odd registers and one or more even registers, and a data input of each odd register is pipelined to a data output of one of the even registers;

the system is configured to control, in response to adjustment of the system clock signal to the first frequency, the odd and even registers using the first periodic clock edge signal;

the system is configured to control, in response to adjustment of the system clock signal to the second frequency, the odd registers using the first periodic clock edge signal and the even registers using the second periodic clock edge signal.

27. The computer program product of claim 25, wherein:

the pipelined logic comprises three or more ("N") registers; and the system is further configured to generate N delayed system clock signals, each delayed system clock signal having a unique phase delay of an integer multiple of 360/N from the system clock signal; and the system is configured to control, in response to adjustment of the system clock signal to the first frequency, each of the N registers using the system clock signal; and the system is configured to control, in response to adjustment of the system clock signal to the second frequency, each of the N registers using one of the N delayed system clock signals.

* * * * *